United States Patent
Trumm et al.

(10) Patent No.: US 10,613,347 B2
(45) Date of Patent: Apr. 7, 2020

(54) POPULATION OF AN EYE MODEL FOR OPTIMIZING SPECTACLE LENSES WITH MEASUREMENT DATA

(71) Applicant: Rodenstock GmbH, Munich (DE)

(72) Inventors: Stephan Trumm, Munich (DE); Wolfgang Becken, Neuried (DE); Helmut Altheimer, Baisweil-Lauchdorf (DE); Adam Muschielok, Munich (DE); Yohann Bénard, Munich (DE); Gregor Esser, Munich (DE); Anne Seidemann, Munich (DE); Werner Mueller, Oetisheim (DE)

(73) Assignee: Rodenstock GmbH, Munich (DE)

( * ) Notice: Subject to any disclaimer, the term of this patent is extended or adjusted under 35 U.S.C. 154(b) by 261 days.

(21) Appl. No.: 15/878,587

(22) Filed: Jan. 24, 2018

(65) Prior Publication Data
US 2018/0210228 A1 Jul. 26, 2018

Related U.S. Application Data

(63) Continuation-in-part of application No. 14/371,376, filed as application No. PCT/EP2013/000073 on Jan. 11, 2013, now Pat. No. 9,910,294.

(30) Foreign Application Priority Data

| Jan. 11, 2012 | (DE) | 10 2012 000 390 |
| Jan. 27, 2017 | (DE) | 10 2017 000 772 |
| Aug. 23, 2017 | (DE) | 10 2017 007 974 |

(51) Int. Cl.
*G06F 17/50* (2006.01)
*G02C 7/02* (2006.01)
(Continued)

(52) U.S. Cl.
CPC ............. *G02C 7/027* (2013.01); *G02C 7/028* (2013.01); *G06F 17/11* (2013.01); *G06F 17/16* (2013.01);
(Continued)

(58) Field of Classification Search
CPC .......... A61L 33/11; A61L 3/111; G02C 7/043; G02C 7/024; G02C 7/02; G06F 17/50; G06F 17/16
See application file for complete search history.

(56) References Cited

U.S. PATENT DOCUMENTS

| 6,390,624 B1 * | 5/2002 | Hough | G02C 7/043 351/159.74 |
| 7,931,374 B2 | 4/2011 | Dai et al. | |

(Continued)

FOREIGN PATENT DOCUMENTS

| DE | 102012000390 A1 | 7/2013 |
| JP | 2008-542831 A | 11/2008 |

(Continued)

OTHER PUBLICATIONS

International Search Report issued for PCT/EP2013/000073.
(Continued)

*Primary Examiner* — Kandasamy Thangavelu
(74) *Attorney, Agent, or Firm* — Schiff Hardin LLP

(57) ABSTRACT

Optimizing and producing a lens by defining an individual eye model, in which a shape of a corneal front surface of a model eye, and a reference aberration at an evaluation surface within the model eye are defined based on individual measurement values for the lens wearer's eye, on standard values, or based on provided individual refraction data; specifying first and second surfaces for the lens to be optimized; determining the path of a main ray through a visual point a surface of the lens into the model eye up to the (Continued)

evaluation surface; evaluating an aberration of a wavefront propagating along the main ray and resulting from a spherical wavefront incident on the first surface of the lens at the evaluation surface in comparison to the reference aberration; and iteratively varying the surface of the lens until the evaluated aberration corresponds to a predetermined target aberration.

17 Claims, 1 Drawing Sheet

(51) Int. Cl.
*G06F 17/16* (2006.01)
*G06F 17/11* (2006.01)
(52) U.S. Cl.
CPC .......... *G06F 17/50* (2013.01); *G06F 2217/12* (2013.01); *G06F 2217/16* (2013.01); *Y02P 90/265* (2015.11)

(56) References Cited

U.S. PATENT DOCUMENTS

| | | | |
|---|---|---|---|
| 8,998,415 | B2 | 4/2015 | Norrby et al. |
| 9,636,214 | B2 | 5/2017 | Piers et al. |
| 9,696,563 | B2 | 7/2017 | Trumm et al. |
| 2002/0085172 | A1 | 7/2002 | Altmann |
| 2003/0107706 | A1 | 6/2003 | Rubinstein et al. |
| 2004/0257527 | A1 | 12/2004 | Qi et al. |
| 2007/0002274 | A1 | 1/2007 | Somani et al. |
| 2008/0221674 | A1 | 9/2008 | Blum et al. |
| 2010/0145489 | A1* | 6/2010 | Esser ............... G02C 7/02 700/97 |
| 2010/0198515 | A1 | 8/2010 | Becken et al. |
| 2011/0228225 | A1 | 9/2011 | Liang |
| 2011/0255052 | A1* | 10/2011 | Meister ............ G02C 7/024 351/159.74 |
| 2011/0299032 | A1 | 12/2011 | Becken et al. |
| 2012/0008090 | A1 | 1/2012 | Atheimer et al. |
| 2012/0033179 | A1* | 2/2012 | Kratzer ............. A61B 3/111 351/206 |
| 2012/0188504 | A1 | 7/2012 | Petignaud et al. |
| 2013/0035760 | A1 | 2/2013 | Portney |
| 2013/0100409 | A1 | 4/2013 | Grant et al. |
| 2014/0340637 | A1* | 11/2014 | Trumm ............. A61B 3/11 351/206 |
| 2015/0309338 | A1 | 10/2015 | Chauveau et al. |

FOREIGN PATENT DOCUMENTS

| | | |
|---|---|---|
| JP | 2010-517089 A | 5/2010 |
| JP | 2010-221050 A | 10/2010 |
| WO | WO-02/084381 A2 | 10/2002 |
| WO | WO-02/088830 A1 | 11/2002 |
| WO | WO-2008/089999 A1 | 7/2008 |
| WO | WO-2010/084019 A1 | 7/2010 |
| WO | WO-2010/124991 A1 | 11/2010 |

OTHER PUBLICATIONS

Office Action dated Oct. 7, 2016 for Japanese Patent Application No. 2014-551573 (with English translation).
Salmon, et al., "Normal-Eye Zernike Coefficients and Root-Mean-Square Wavefront Errors", Journal of Cataract & Refractive Surgery, vol. 32, issue 12, pp. 2064-2074, 20006.
Porter, et al., "Monochromatic Aberrations of the Human Eye in a Large Population", Journal of the Optical Society of America A, vol. 18, issue 8, pp. 1796-1803, 2001.
Esser, et al., "Derivation of the Refraction Equations for Higher Order Aberrations of Local Wavefronts at Oblique Incidence", Journal of the Optical Society of America A, vol. 27, issue 2, pp. 218-237, 2010.
Esser, et al., "Derivation of the Propogation Equations for Higher Order Aberrations of Local Wavefronts", Journal of the Optical Society of America A, vol. 28, issue 12, pp. 2442-2458, 2011.
Rabbetts, R. B., "Bennett & Rabbetts' Clinical Visual Optics", Butterwort Heinemann Elsevier Health Sciences, 2007 (Product description only).
Kaschke, M., et al., "Optical Devices in Ophthalmology and Optometry", Wiley-VCH, 2014 (product description only).

\* cited by examiner

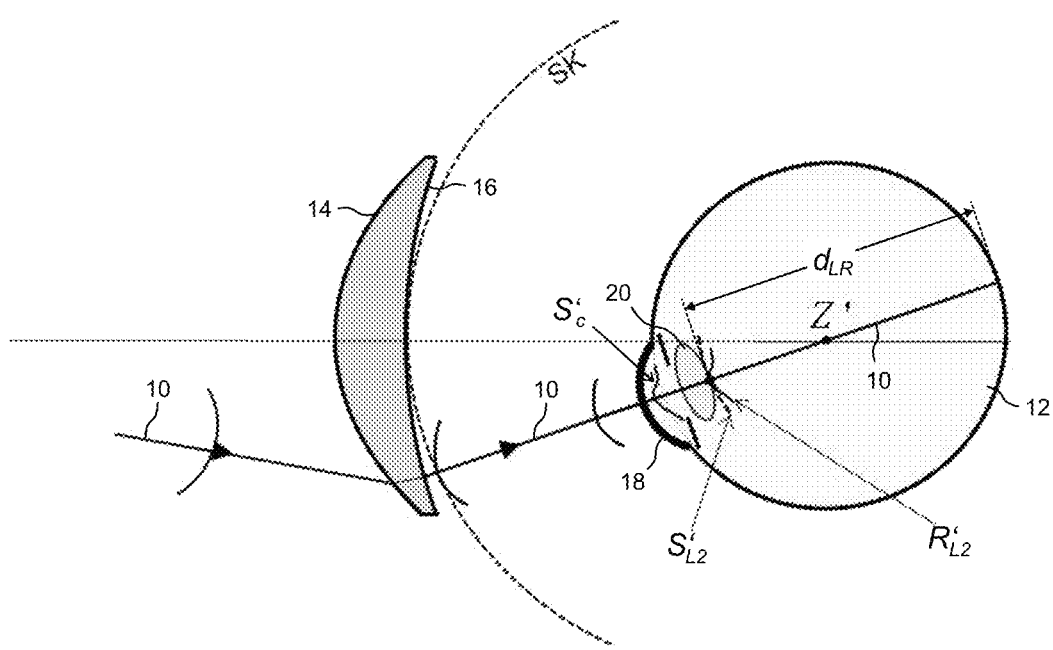

POPULATION OF AN EYE MODEL FOR OPTIMIZING SPECTACLE LENSES WITH MEASUREMENT DATA

The present invention relates to a method, an apparatus, and a corresponding computer program product for calculating (optimizing) and producing a spectacle lens with the help of a partially individual eye model.

For the production or optimization of spectacle lenses, in particular of individual spectacle lenses, each spectacle lens is manufactured such that the best possible correction of a refractive error of the respective eye of the spectacle wearer is obtained for each desired direction of sight or each desired object point. In general, a spectacle lens is said to be fully correcting for a given direction of sight if the values sphere, cylinder, and axis of the wavefront, upon passing the vertex sphere, match with the values for sphere, cylinder, and axis of the prescription for the eye having the visual defect. In the refraction determination for an eye of a spectacle wearer, dioptric values (particularly sphere, cylinder, cylinder axis—i.e. in particular sphero-cylindrical deviations) for a far (usually infinite) distance and optionally (for multifocal or progressive lenses) an addition or a complete near refraction for a near distance (e.g. according to DIN 58208) are determined. In modern spectacle lenses, object distances deviating from the standard, which are used in the refraction determination, can be indicated additionally. In this way, a prescription (in particular sphere, cylinder, cylinder axis, and optionally addition or near refraction) to be communicated to a spectacles manufacturer is stipulated. Knowledge of a special or individual anatomy of the respective eye or the refractive indices of the eye having the visual defect, which are actually present in the individual case, is not required here.

However, a full correction for all directions of sight at the same time is normally not possible. Therefore, the spectacle lenses are manufactured such that they achieve a good correction of visual defects of the eye and only small aberrations in the main zones of use, especially in the central visual zones, while larger aberrations are permitted in peripheral zones.

In order to be able to manufacture a spectacle lens in this way, the spectacle lens surfaces or at least one of the spectacle lens surfaces is first calculated such that the desired distribution of the unavoidable aberrations is effected thereby. This calculation and optimization is usually performed by means of an iterative variation method by minimization of a target function. As a target function, particularly a function F having the following functional relation with the spherical power S, the magnitude of the cylindrical power Z, and the axis of the cylinder $\alpha$ (also referred to as "SZA" combination) is taken into account and minimized:

$$F = \sum_{i=1}^{m} [g_{i,S\Delta}(S_{\Delta,i} - S_{\Delta,i,target})^2 + g_{i,Z\Delta}(Z_{\Delta,i} - Z_{\Delta,i,target})^2 + \ldots]$$

In the target function F, at the evaluation points i of the spectacle lens, at least the actual refractive deficits of the spherical power $S_{\Delta,i}$ and the cylindrical power $Z_{\Delta,i}$ as well as target specifications for the refractive deficits of the spherical power $S_{\Delta,i,target}$ and the cylindrical power $Z_{\Delta,i,target}$ are taken into consideration.

It was found in DE 103 13 275 that it is advantageous to not indicate the target specifications as absolute values of the properties to be optimized, but as their deviation from the prescription, i.e. as the required local maladjustment. The advantage is that the target specifications are independent of the prescription ($Sph_V, Zyl_V, Axis_V, Pr_V, B_V$) and that the target specifications do not have to be changed for every individual prescription. Thus, as "actual" values of the properties to be optimized, not absolute values of these optical properties are taken into account in the target function, but the deviations from the prescription. This has the advantage that the target values can be specified independent of the prescription and do not have to be changed for every individual prescription.

The respective refractive deficits at the respective evaluation points are preferably taken into consideration with weighting factors $g_{i,S\Delta}$ and $g_{i,Z\Delta}$. Here, the target specifications for the refractive deficits of the spherical power $S_{\Delta,i,target}$ and/or the cylindrical power $Z_{\Delta,i,target}$, particularly together with the weighting factors $g_{i,S\Delta}$ and $g_{i,Z\Delta}$, form the so-called spectacle lens design. In addition, particularly further residues, especially further parameters to be optimized, such as coma and/or spherical aberration and/or prism and/or magnification and/or anamorphic distortion, etc., can be taken into consideration, which is particularly implied by the expression "+ . . . " in the above-mentioned formula for the target function F.

In some cases, consideration not only of aberrations up to the second order (sphere, magnitude of the astigmatism, and cylinder axis) but also of higher order (e.g. coma, trefoil, spherical aberration) may in some cases contribute to a clear improvement particularly of an individual adaptation of a spectacle lens.

It is known from the prior art to determine the shape of a wavefront for optical elements and particularly spectacle lenses that are delimited by at least two refractive boundary surfaces. For example, this can be done by means of a numerical calculation of a sufficient number of neighboring rays, along with a subsequent fit of the wavefront data by Zernike polynomials. Another approach is based on local wavefront tracing in the refraction (cf. WO 2008/089999 A1). Here, only one single ray (the main ray) per visual point is calculated, accompanied by the derivatives of the vertex depths of the wavefront according to the transversal coordinates (perpendicular to the main ray). These derivatives can be formed up to a specific order, wherein the second derivatives describe the local curvature properties of the wavefront (such as refractive power, astigmatism), and the higher derivatives are related to the higher-order aberrations.

In the tracing of light through a spectacle lens, the local derivatives of the wavefront are calculated at a suitable position in the ray path in order to compare them with desired values obtained from the refraction of the spectacle lens wearer. As the position at which the wavefronts are evaluated, usually the vertex sphere or e.g. the principal plane of the eye for the corresponding direction of sight is considered. In this respect, it is assumed that a spherical wavefront starts at the object point and propagates up to the first spectacle lens surface. There, the wavefront is refracted and subsequently propagates to the second spectacle lens surface, where it is refracted again. The last propagation takes place from the second boundary surface to the vertex sphere (or the principal plane of the eye), where the wavefront is compared with the predetermined values for the correction of the refraction of the eye of the spectacle wearer.

To make this comparison on the basis of the determined refraction data of the respective eye, an established model of the eye having the visual defect, in which a base eye having normal vision is overlaid with a visual defect (refractive deficit), is assumed for the evaluation of the wavefront at the vertex sphere. This has proven particularly successful as further knowledge of the anatomy or optics of the respective eye (e.g. distribution of the refractive powers, eye length, length ametropia and/or refractive power ametropia) is not required. A detailed description of this model of spectacle lens and refractive deficit can be found e.g. in Dr. Roland Enders "Die Optik des Auges und der Sehhilfen", Optische Fachveröffentlichung GmbH, Heidelberg, 1995, pages 25 ff. and in Diepes, Blendowske "Optik und Technik der Brille", Optische Fachveröffentlichung GmbH, Heidelberg, 2002, pages 47 ff. As a proven model, in particular the described correction model according to REINER is used.

Here, the refractive deficit is considered to be the lack or excess of refractive power of the optical system of the eye having the visual defect compared with an equally long eye having normal vision (residual eye). The refractive power of the refractive deficit is in particular approximately equal to the distance point refraction with negative sign. For a full correction of the visual defect, the spectacle lens and the refractive deficit together from a telescopic system (afocal system). The residual eye (eye having the visual defect without added refractive deficit) is considered to have normal vision. Thus, a spectacle lens is said to be fully correcting for distance if its image-side focal point coincides with the distance point of the eye having the visual defect and thus also with the object-side focal point of the refractive deficit.

It is the object of the invention to provide an improved method for calculating or optimizing a spectacle lens, preferably a progressive spectacle lens, wherein the spectacle lens is adapted to the individual needs of the spectacle wearer already with simple measurements of individual, optical, and eye-anatomical data in a very effective way. This object is solved by a computer-implemented method, an apparatus, a computer program product, and a storage medium with the features indicated in the independent claims. Preferred embodiments are subject of the dependent claims.

According to a first aspect, the invention provides a computer-implemented method for calculating or optimizing a spectacle lens for at least one eye of a spectacle wearer. To this end, at first individual refraction data of the at least one eye of the spectacle wearer is provided. This individual refraction data is based on an individual refraction determination. The refraction data at least comprise the spherical and astigmatic visual defects of the eye. In a preferred embodiment, the collected refraction data also describe higher-order aberrations (HOA). Preferably, the refraction data (also referred to as aberrometric data particularly if they comprise higher-order aberrations) is measured by an optician, for example, by means of an aberrometer (objective refraction data). Alternatively or in addition, a subjectively determined refraction can be used as well. Subsequently, the refraction data will preferably be communicated to a spectacles producer and/or provided to a calculation or optimization program. They are therefore available to be collected, in particular to be read out and/or received in digital form for the method of the invention.

Preferably, providing the individual refraction data comprises providing or determining the vergence matrix $S_M$ of the visual defect of the at least one eye. The vergence matrix describes a wavefront in front of the eye of the light emerging from a point on the retina or light converging in a point on the retina. Metrologically, such refraction data can be determined, for example, by illuminating a point on the retina of the spectacle wearer by means of a laser, from which light then propagates. While the light from the illuminated point initially diverges substantially spherically in the vitreous body of the eye, the wavefront may change as it passes through the eye, particularly at optical boundary surfaces in the eye (e.g., the eye lens and/or the cornea). By measuring the wavefront in front of the eye, the refraction data of the eye can thus be measured. For the purposes of description, this wavefront will be referred to as the refraction wavefront below.

In addition, the method according to the invention comprises defining an individual eye model, which individually defines at least certain specifications about geometrical and optical properties of a model eye. Thus, in the individual eye model according to the invention, at least one shape (topography) of a corneal front surface of the model eye and further data are defined, which define the optical properties inside the model eye to the extent that a reference aberration is defined on an evaluation surface within the model eye. In particular, the reference aberration describes an aberration of a reference wavefront converging substantially in one point on a retina of the eye model (directly or indirectly) before refraction on a lens back surface of a lens of the model eye.

Convergence "substantially" in one point in particular means that a predetermined deviation of the convergence from one point may be permissible, as far as this deviation does not impair the required or desired accuracy of fitting of the spectacle lens. For example, inaccurate convergence in one point may arise and may also be acceptable if the reference aberration reflects the major or dominant portions or terms of the user's visual defect (e.g. aberrations up to a predetermined order), but ignores other terms (e.g. aberrations higher than the predetermined order).

In preferred embodiments, the eye model further defines a cornea-lens distance $d_{CL}$ (this distance between the cornea and a lens front surface of the model eye is also referred to as anterior chamber depth), parameters of the lens of the model eye, which in particular at least partially define the optical power of the lens of the model eye, and a lens-retina distance $d_{LR}$ (this distance between the lens, in particular the lens back surface, and the retina of the model eye is also referred to as vitreous body length) in a specific manner, namely such that the model eye has the provided individual refraction data, i.e. a wavefront emanating in the model eye from a point of the retina of the model eye coincides with the wavefront determined (e.g., measured or otherwise determined) for the real eye of the spectacle wearer (up to a desired accuracy). As parameters of the lens of the model eye (lens parameters), for example either geometric parameters (shape of the lens surfaces and their spacing) and preferably material parameters (e.g. refractive indices of the individual components of the model eye) can be defined completely to the extent that they at least partially define an optical power of the lens. Alternatively or in addition, parameters that directly describe the optical power of the lens of the model eye can also be defined as lens parameters.

Thus, in a simple case of an eye model, the refraction of the eye is determined by the optical system consisting of the corneal front surface, the eye lens and the retina. In this simple model, the refraction on the corneal front surface and the refractive power of the eye lens (preferably including the spherical and astigmatic aberrations and higher order aberrations), together with their positioning relative to the retina, define the refraction of the model eye.

The individual variables (parameters) of the model eye are defined correspondingly on the basis of individual measurement values for the eye of the spectacle wearer and/or on the basis of standard values and/or on the basis of the provided individual refraction data. In particular, some of the parameters (e.g. the topography of the corneal front surface and/or the anterior chamber depth and/or at least a curvature of a lens surface, etc.) may be provided directly as individual measurement values. Other values may also be adopted from values of standard models for a human eye, in particular if they are parameters whose individual measurement is very complicated. All in all, however, not all (geometrical) parameters of the model eye have to be predefined from individual measurements or from standard models. Rather, for one or more (free) parameters, an individual adaptation can be performed by calculation taking into account the predetermined parameters in such a way that the resulting model eye has the provided individual refraction data. Depending on the number of parameters included in the individual refraction data provided, a corresponding number of (free) parameters of the eye model can be individually adjusted (fitted).

A first surface and a second surface of the spectacle lens are particularly specified as starting surfaces with a specified (individual) position relative to the model eye for the calculation and optimization of the spectacle lens. In a preferred embodiment, only one of the two surfaces is optimized. Preferably, this will be the back surface of the spectacle lens. Preferably, a corresponding starting surface is specified both for the front surface and for the back surface of the spectacle lens. In a preferred embodiment, only one surface is modified or optimized iteratively during the optimization process though. The other surface of the spectacle lens may be a simple spherical or rotationally symmetrical aspherical surface. However, it is also possible to optimize both surface.

Based on the two predetermined surfaces, the method comprises determining the path of a main ray through at least one visual point (i) of at least one surface of the spectacle lens to be calculated or optimized. The main ray describes the geometric ray path starting from an object point through the two spectacle lens surfaces and at least the corneal front surface, preferably also through the lens of the model eye in particular up to the retina of the model eye.

In addition, the method comprises evaluating an aberration of a wavefront propagating along the main ray and resulting from a spherical wavefront incident on the first surface of the spectacle lens at the evaluation surface in comparison to the reference aberration, in particular in comparison to a corresponding reference wavefront.

To this end, a spherical wavefront ($w_0$) incident on the first surface (front surface) of the spectacle lens along the main ray is specified. This spherical wavefront describes the light (object light) originating from an object point. The curvature of the spherical wavefront when being incident on the first surface of the spectacle lens corresponds to the reciprocal of the object distance. Preferably, the method thus comprises specifying an objective distance model, which assigns an object distance to each direction of sight or each visual point of the at least one surface of the spectacle lens to be optimized. In this way, preferably the individual situation of wear, in which the spectacle lens to be produced is to be used, is described.

The wavefront incident on the spectacle lens is now refracted on the front surface of the spectacle lens preferably for the first time. Subsequently, the wavefront propagates along the main ray within the spectacle lens from the front surface to the back surface, where it is refracted for the second time. The wavefront transmitted through the spectacle lens then propagates along the main ray to the corneal front surface of the spectacle lens, where it is refracted again. After further propagation of the wavefront within the eye to the eye lens, it is refracted there as well to. In reality, after being refracted at the eye lens, the object light propagates further to the retina of the eye. Depending on the optical properties of the individual optical elements (spectacle lens surfaces, corneal front surface, eye lens), each refraction process causes a deformation of the wavefront.

To attain exact imaging of the object point onto an image point on the retina, the wavefront would have to exit the eye lens preferably as a converging spherical wavefront, the curvature of which precisely corresponding to the reciprocal of the distance to the retina. A comparison of the wavefront emanating from the object point with a wavefront (reference light) converging at a point on the retina (ideally a perfect image) thus permits the evaluation of a maladjustment. This comparison, and thus the evaluation of the wavefront of the object light in the individual eye model, is carried out on an evaluation surface within the model eye according to the invention, even before the propagation of the object light from the eye lens (for example the lens back surface or exit pupil) to the retina. For each object point, the calculation of the object light thus takes place at least up to the model eye or into the model eye, but not up to the retina. In order to be able to carry out the comparison and thus the evaluation of the wavefront of the object light, a reference aberration is determined or provided on the evaluation surface, which describes the optical imaging properties, in particular the influence on the eye's visual defect on the optical path between the evaluation surface and the retina. Preferably, a corresponding reference wavefront is determined, which describes a wavefront converging substantially in one point on the retina of the individual eye model. According to the invention, since the evaluation surface should not be located behind the eye lens or not behind the lens back surface, the reference wavefront must propagate at least from the lens of the model eye to the retina in order to converge in a point on the retina.

For example, if the evaluation surface is provided on the lens back surface of the lens, before refraction on the lens back surface of the model eye, the resulting wavefront of the object light may be easily compared to a spherical wavefront of the reference light refracted (backward) on the lens back surface. For this purpose, the method preferably comprises specifying a spherical wavefront impinging on the first surface of the spectacle lens, determining a wavefront resulting from the power of at least the first and second surfaces of the spectacle lens, the corneal front surface and the lens front surface as well as the lens thickness of the model eye from the spherical wavefront in the at least one eye, and evaluating the aberration of the resulting wavefront compared to a spherical wavefront converging on the retina prior to its refraction at the lens back surface.

If, on the other hand, an evaluation surface is to be provided within the lens or between the corneal front surface and the lens of the model eye, it is preferable to simply simulate inverted propagation from a point on the retina through the individual components of the model eye to the evaluation surface as the reference light, in order to there make a comparison of the object light with the reference light. Thus, the method preferably comprises determining the reference wavefront by calculating propagation and refraction from a point on the retina of the model eye through the model eye to the evaluation surface.

Alternatively, for the determination of the reference wavefront at the evaluation surface, an individually measured refraction wavefront in front of the eye of the spectacle wearer can be assumed, and the propagation of this wavefront into the model eye up to the evaluation surface can be calculated. Thus, providing individual refraction data of the at least one eye of the spectacle wearer comprises providing an individual refraction wavefront of the eye of the spectacle wearer, which describes a wavefront, exiting the spectacle wearer's eye, of light emanating from a point on the retina of the spectacle wearer's eye, and wherein the method further comprises determining the reference wavefront with the provided individual refraction wavefront by calculating propagation and refraction based on the individual refraction wavefront through the model eye up to the evaluation surface. Depending on the position of the evaluation surface, the method in which fewer propagation steps must be calculated is preferably used.

However, as mentioned at the outset, a full correction of the eye's refraction for all directions of sight of the eye, i.e. for all visual points of the at least spectacle lens surface to be optimized, at the same time is generally not possible. Depending on the direction of sight, a deliberate maladjustment of the spectacle lens is preferably provided, which according to the situation of use is low in the mainly used zones of the spectacle lens (e.g. central visual points), and slightly higher in the zones not used to much (e.g. peripheral visual points). This approach is basically known from conventional optimization methods.

To optimize the spectacle lens, the at least one surface of the spectacle lens to be calculated or optimized is varied iteratively until an aberration of the resulting wavefront corresponds to a specified target aberration, i.e. in particular deviates from the wavefront of the reference light (e.g. a spherical wavefront, which has its center of curvature on the retina) by specified values of the aberration. The wavefront of the reference light is also referred to as a reference wavefront here. Preferably, the method comprises minimizing a target function F, in particular analogous to the target function described at the outset. Further preferred target functions, in particular for consideration of higher-order aberrations, will be described further below.

In the context of the present invention, it has thus been proposed to define an individual eye model for the calculation or optimization of a spectacle lens that is preferably adapted individually to the individual spectacle wearer up to the retina. A numerical ray and wavefront tracing is then carried out on this individual eye model such that it is preferably divided into two portions by the evaluation surface, of which a first portion for each visual point of the at least one surface of the spectacle lens to be calculated or optimized comprises a calculation of the object light up to the individual model eye or into the individual model eye, but not up to behind the lens of the model eye, while a second portion comprises determining the reference aberration (in particular the reference wavefront) corresponding to the individual eye model.

Thus, for each viewing point, in particular a propagation of the object light up to the corneal front surface and particularly preferably also a refraction of the wavefront of the object light is calculated at least at the corneal front surface. Due to the positioning of the evaluation surface not behind (or in particular even in front of) the lens back surface, propagation of the object light from the lens of the model eye to the retina does not have to be calculated at least for each visual point and especially not for each iteration step. Instead, by means of the reference aberration or reference wave function at the evaluation surface a backward propagation from the retina to the evaluation surface is simulated, which however does not have to be recalculated for each iteration step, and perhaps not even for each visual point.

In the context of the present invention, it has been found that this brings about a remarkable improvement of the individual adaptation with comparatively little effort. While the tracing of the object light up to the eye in conjunction with the individual eye model significantly improves the individual adaptation of the spectacle lens clearly, by canceling the complete tracing of the object light prior to the propagation from the lens to the retina of the model eye, a rapid convergence of the iterative, numerical process can be achieved without significantly affecting the accuracy of the adaptation. In particular, this can also be attributed to the fact that although the determined reference aberration or reference wave function replaces parts of the exact, visual point-specific wavefront tracing, it is also based on the individual eye model, in particular the individual refraction data.

Preferably, the evaluation surface is located at a boundary surface of the model eye, in particular within the model eye, in particular on the lens back surface or on the lens front surface or on the cornea or on a surface (boundary surface) of the cornea (e.g. corneal back surface). More preferably, the reference aberration describes the aberration of the reference wavefront substantially converging in a point on a retina of the eye model prior to a refraction at the boundary surface at which the evaluation surface is located. Particularly preferably, evaluating the aberration of the wavefront, propagating along the main ray, at the evaluation surface comprises calculating a refraction of the wavefront at the boundary surface at which the evaluation surface is located. The change of propagation steps and refraction steps in the numerical description and calculation of the course of the object light thus ends with a refraction step, while the subsequent propagation step already forms part of the simulation of the reference aberration or reference wave function. Just this approach has been found to be particularly preferred. In particular, the calculation of propagation of wavefronts places high demands on numerical calculation units and requires comparatively much processor time. By canceling the calculation of the object light after refraction, the subsequent light propagation need not be recalculated for each visual point and each iteration step. Instead, the same reference aberration or reference wave function can be used for each iteration step and yet a very good individual adaptation of the spectacle lens is achieved, at least insofar as the reference wave function is based on the individual eye model according to the invention.

In a particularly preferred embodiment, the evaluation surface is located on the lens front surface. Preferably, in particular in this case, in the individual eye model furthermore at least a cornea-lens distance; and
the shape of a lens front surface of the lens of the model eye are defined based on individual measurement values for the eye of the spectacle wearer and/or on standard values and/or based on the provided individual refraction data such that the model eye (12) has the individual refraction data provided. The reference wavefront can be determined in at least two different preferred ways, namely by forward propagation and refraction starting from a refraction wavefront in front of the spectacle wearer's eye or by backward propagation and refraction starting from a point on the retina of the model eye.

For forward propagation and refraction of the reference light, providing individual refraction data of the at least one eye of the spectacle wearer preferably comprises providing an individual refraction wavefront of the eye of the spectacle wearer, which describes a wavefront, exiting the eye of the spectacle wearer, of light emanating from a point on the retina of the eye of the spectacle wearer. For example, this may be a wavefront measured directly by an autorefractometer or aberrometer for the spectacle wearer's eye. Starting from this refraction wavefront, the reference wavefront can be determined by calculating refraction at the corneal front surface of the model eye, propagation through the corneal-lens distance, and refraction at the lens front surface of the model eye.

For backward propagation and refraction, preferably in the individual eye model furthermore at least
a lens thickness; and
the shape of a lens back surface of the lens of the model eye,
particularly preferably also a lens-retina distance
are defined based on individual measurement values for the eye of the spectacle wearer and/or on standard values and/or based on the provided individual refraction data such that the model eye (12) has the individual refraction data provided. The reference wavefront can then be determined by specifying a spherical wavefront emanating from the retina and calculating the refraction of the spherical wavefront at the lens back surface as well as the propagation from the lens back surface to the lens front surface.

In another preferred embodiment, the evaluation surface is located on the corneal front surface. This is particularly preferred when there is a (measured) refraction wavefront of the eye along with a corneal topography. Preferably, providing individual refraction data of the at least one eye of the spectacle wearer comprises providing an individual refraction wavefront of the spectacle wearer's eye, which describes a wavefront, exiting the spectacle wearer's eye, of light emanating from a point on the retina of the spectacle wearer's eye. The reference wavefront can then be determined based on the provided individual refraction wavefront by calculating its refraction at the corneal front surface of the model eye.

Preferably, the corneal front surface is measured individually and the eye lens of the individual eye model is calculated accordingly in order to fulfill the individually determined refraction data. In this case, in a preferred embodiment, the corneal front surface (or its curvature) is measured individually along the principal meridians (topometry). In further preferred embodiment, the topography of the corneal front surface (i.e. the complete description of the surface) is measured individually. In a further preferred embodiment, defining the cornea-lens distance takes place on the basis of individual measurement values for the cornea-lens distance.

Inasmuch as an eye model with a lens on the basis of a lens front surface, a lens thickness and a lens back surface is used, in a particularly preferred embodiment the lens thickness and the shape of the lens back surface are defined on the basis of predetermined values (standard values, for example from specialist literature), wherein more preferably defining the shape of the lens front surface comprises:
providing standard values for a mean curvature of the lens front surface; and
calculating the shape of the lens front surface taking into account the individual refraction data provided.

In a further preferred embodiment of the more detailed lens model, defining the shape of the lens front surface comprises:
providing an individual measurement value of a curvature in a normal meridian of the lens front surface.

In this case, it is particularly preferred that defining the lens thickness and the shape of the lens back surface is carried out on the basis of standard values, and that even more preferably defining the shape of the lens front surface comprises:
calculating the shape of the lens front surface taking into account the provided individual refraction data and the provided individual measured value of the curvature in a normal meridian of the lens front surface.

Alternatively or in addition to the shape of the lens or the lens surfaces, defining the lens parameters may comprise defining an optical power of the lens. In particular, at least one position of at least one main plane and a spherical power (or at least a focal length) of the lens of the model eye is defined. Particularly preferably, a cylindrical power (magnitude and cylinder axis) of the lens of the model eye is defined as well. In a further preferred embodiment, higher-order optical aberrations of the lens of the model eye can also be defined.

In a further aspect, the invention provides an apparatus for calculating or optimizing a spectacle lens for at least one eye of a spectacle wearer, comprising:
a data interface for providing individual refraction data of the at least one eye of the spectacle wearer;
a modelling module for defining an individual eye model, which defines at least
a shape of a corneal front surface of a model eye; and
a reference aberration at an evaluation surface within the model eye based on individual measurement values for the eye of the spectacle wearer and/or on standard values and/or based on the provided individual refraction data such that the model eye has the individual refraction data provided, wherein the reference aberration in particular describes an aberration of a reference wavefront converging substantially in one point on a retina of the eye model prior to refraction on a lens back surface of a lens of the model eye;
a surface model database for specifying a first surface and a second surface for the spectacle lens to be calculated or optimized;
a main ray determination module for determining the path of a main ray through at least one visual point (i) of at least one surface of the spectacle lens to be calculated or optimized into the model eye at least up to the evaluation surface;
an evaluation module for evaluating an aberration of a wavefront propagating along the main ray and resulting from a spherical wavefront incident on the first surface of the spectacle lens at the evaluation surface in comparison to the reference aberration; and
an optimization module iteratively varying the at least one surface of the spectacle lens to be calculated or optimized until the evaluated aberration corresponds to a predetermined target aberration.

Further, the invention provides a computer program product, in particular in the form of a storage medium or a data stream, which includes program code adapted, when loaded and executed on a computer, to perform a method for calculating or optimizing a spectacle lens according to the present invention, particularly in a preferred embodiment thereof.

In addition, the invention provides a method for producing a spectacle lens, comprising:

calculating or optimizing a spectacle lens according to the method for calculating or optimizing a spectacle lens according to the present invention, particularly in a preferred embodiment thereof;

manufacturing the thus calculated or optimized spectacle lens.

Moreover, the invention provides an apparatus for producing a spectacle lens, comprising:

calculating and optimizing means adapted to calculate or optimize the spectacle lens according to a method for calculating or optimizing a spectacle lens according to the present invention, particularly in a preferred embodiment thereof;

machining means adapted to finish the spectacle lens.

Further, the invention provides a use of a spectacle lens, produced according to the production method of the present invention, particularly a preferred embodiment thereof, in a predetermined average or individual wearing position of the spectacle lens in front of the eyes of a specific spectacle wearer, for correcting a visual defect of the spectacle wearer.

Preferred embodiments of the invention will be described by way of example in the following with reference to the accompanying drawings, which show:

FIG. 1 a schematic illustration of the physiological and physical model of a spectacle lens and an eye along with a ray path in a predetermined wearing position.

FIG. 1 shows a schematic illustration of the physiological and physical model of a spectacle lens in a predetermined wearing position along with an exemplary ray path, on which an individual spectacle lens calculation or optimization according to a preferred embodiment of the invention is based.

Here, preferably only one single ray (the main ray 10, which preferably passes through the ocular center of rotation Z') is calculated per visual point of the spectacle lens, but further also the derivatives of the vertex depths of the wavefront according to the transversal coordinates (perpendicular to the main ray). These derivatives are taken into consideration up to the desired order, wherein the second derivatives describe the local curvature properties of the wavefront and the higher derivatives are related to the higher-order aberrations.

In the tracing of light through the spectacle lens up into the eye 12 according to the individually provided eye model, the local derivatives of the wavefronts are ultimately determined at a suitable position in the ray path in order to compare them with a reference wavefront there, which converges in a point on the retina of the eye 12. In particular, the two wavefronts (i.e. the wavefront coming from the spectacle lens and the reference wavefront) are compared to each other in an evaluation surface.

"Position" does not simply mean a certain value of the z-coordinate (in the direction of light), but such a coordinate value in combination with the indication of all surfaces through which refraction took place before the evaluation surface was reached. In a preferred embodiment, refraction takes place through all refractive surfaces including the lens back surface. In this case, the reference wavefront is preferably a spherical wavefront whose center of curvature is located on the retina of the eye 12.

It is particularly preferred not to propagate further after this last refraction, so that the radius of curvature of this reference wavefront corresponds exactly to the distance between the lens back surface and the retina. In an alternative possibility, it is still propagated after the last refraction, preferably up to the exit pupil AP of the eye 12. It is in front of the retina and thus even in front of the lens back surface for example at a distance $d_{AR} = d_{LR}^{(b)} = d_{LR} - d_{LR}^{(a)} > d_{LR}$, so that the propagation in this case is a back propagation (the terms $d_{LR}^{(a)}$, $d_{LR}^{(b)}$ will be described later when steps 1-6 are listed). Also in this case is the reference wavefront spherical with the center of curvature on the retina, but has a radius of curvature $1/d_{AR}$.

To this end, it is assumed that a spherical wavefront $w_0$ originates from an object point and propagates to the first spectacle lens surface 14. There, it is refracted and subsequently propagates to the second spectacle lens surface 16, where it is refracted again. The wavefront $w_{g1}$ exiting the spectacle lens subsequently propagates along the main ray toward the eye 12 (propagated wavefront $w_{g2}$) until it hits the cornea 18, where it is refracted again (wavefront $w_c$). After a further propagation within the anterior eye chamber to the eye lens 20, the wavefront is refracted again by the eye lens 20 as well, whereby the resulting wavefront $w_e$ forms e.g. at the back surface of the eye lens 20 or at the exit pupil of the eye. The resulting wavefront is compared to the spherical reference wavefront $w_s$, and the deviations are evaluated for all visual points in the target function (preferably with corresponding weightings for the individual visual points).

Thus, the visual defect is not only described by a thin spherocylindrical lens anymore, as this was common in conventional methods, but preferably the corneal topography, the eye lens, the distances in the eye, and the deformation of the wavefront (including the lower-order aberrations—i.e. sphere, cylinder, and cylinder axis—and preferably also including the higher-order aberrations) in the eye are directly considered.

Preferably, an aberrometer measurement provides the individual wavefront deformations of the real eye having the visual defect for distance and near (deviations, no absolute refractive powers) and the individual mesopic and photopic pupil diameters. From a measurement of the corneal topography (extensive measurement of the corneal front surface), the individual real corneal front surface, which generally makes up almost 75% of the overall refractive power of the eye, is obtained. In a preferred embodiment, it is not required to measure the corneal back surface. Due to the small refractive index difference to the chamber water and due to the low corneal thickness, it is preferably described in good approximation not by a separate refractive surface, but by an adjustment of the refractive index of the cornea.

Generally, in this specification, bold lowercase letters shall denote vectors and bold uppercase letters shall denote matrices, e.g. the (2×2)—vergence matrices or refractive power matrices $$S = \begin{pmatrix} S_{xx} & S_{xy} \\ S_{xy} & S_{yy} \end{pmatrix}, C = \begin{pmatrix} C_{xx} & C_{xy} \\ C_{xy} & C_{yy} \end{pmatrix}, L = \begin{pmatrix} L_{xx} & L_{xy} \\ L_{xy} & L_{yy} \end{pmatrix}, 1 = \begin{pmatrix} 1 & 0 \\ 0 & 1 \end{pmatrix}$$

and italic ones such as d shall denote scalar quantities.

Furthermore, bold, italic capital letters shall denote wavefronts or surfaces as a whole. For example, $S$ is the vergence matrix of the eponymous wavefront $S$, except that $S$ also includes the totality of all higher-order aberrations (HOA) of the wavefront besides the second-order aberrations, which are summarized in S. Mathematically, $S$ stands for the set of all parameters necessary to describe a wavefront (sufficiently accurate) with respect to a given coordinate system. Preferably, $S$ stands for a set of Zernike coefficients with a pupil radius or a set of coefficients of a Taylor series. Particularly preferably, S stands for the set of a vergence matrix S for describing second-order wavefront properties and a set of Zernike coefficients (with a pupil radius) used to describe all remaining wavefront properties other than the $2^{nd}$ order or a set of coefficients according to a Taylor decomposition. Analogous statements apply for surfaces instead of wavefronts.

Among other things, the following data can in principle be measured directly:

The wavefront $S_M$, which is generated by the laser spot on the retina and the passage through the eye (from aberrometric measurement)

Shape of the corneal front surface c (through corneal topography)

Distance between cornea and the lens front surface $d_{CL}$ (by pachymetry). This variable can also be determined indirectly by measuring the distance between the cornea and the iris, with correction values possibly being used. Such corrections may be the distance between the lens front surface and the iris from known eye models (e.g. literature values).

Curvature of the lens front surface in a direction $L_{1,xx}$ (by pachymetry). Here, without limiting the generality, the x plane can be defined such that this section lies in the x plane. If the coordinate system is defined so that this plane is oblique, the derivative must be supplemented by the functions of the corresponding angle. It is not required that this be a principal meridian. For example, it may be the section in the horizontal plane.

Furthermore, the following data—depending on the embodiment—can either be measured or taken from the literature:

Thickness of the lens $d_L$

Curvature of the lens back surface in the same direction as the lens front surface $L_{2,xx}$ (by pachymetry)

Thus, there are the following options for the lens back surface:

Measurement of $L_{2,xx}$ ($L_{2,M}$) and assumption of rotational symmetry $L_{2,xx}=L_{2,yy}=L_2=L_{2,M}$ and $L_{2,xy}=L_{2,yx}=0$ Taking $L_{2,xx}$ from the literature ($L_{2,Lit}$) and assuming a rotational symmetry $L_{2,xx}=L_{2,yy}=L_2=L_{2,M}$ and $L_{2,xy}=L_{2,yx}=0$ Taking the complete (asymmetrical) form $L_2$ from the literature ($L_{2,Lit}$)

Measurement of $L_{2,xx}$ ($L_{2,M}$) and assumption of a cylinder or some other specified asymmetry $\alpha_{Lit}$ from the literature $L_{2,xx}=L_{2,M}$ and $L_{2,xy}=L_{2,yx}=f(L_{2,xx},\alpha_{Lit})$ as well as $L_{2,yy}=g(L_{2,xx},\alpha_{Lit})$ The following data can be found in the literature:

Refractive indices $n_{CL}$ of the cornea and the anterior eye chamber as well as of the chamber water $n_{LR}$ and of the lens $n_L$ Thus, in particular the distance $d_{LR}$ between the lens back surface and the retina as well as the components $L_{1,yy}$ and $L_{1,yy}=L_{1,yx}$ of the lens front surface remain as unknown parameters. To simplify the formalism, the former can also be written as a vergence matrix $D_{LR}=D_{LR}\cdot 1$ with $D_{LR}=n_{LR}/d_{LR}$. Furthermore, the variable r is generally used, which is defined as $\tau=d/n$ (where for the refractive index, as n, always the corresponding index as for d and $\tau$ is to be used, e.g. as $\tau_{LR}=d_{LR}/n_{LR}$, $\tau_{CL}=d_{CL}/n_{CL}$).

Modeling of the passage of the wavefront through the eye model used according to the invention, i.e. after passing through the surfaces of the spectacle lens, can be described as follows in a preferred embodiment, in which the lens is described via a front and a back surface, with the transformations of the vergence matrices being explicitly indicated:

1. Refraction of the wavefront S with the vergence matrix S on the cornea C with the surface refractive power matrix C to the wavefront $s'_c$ with vergence matrix $s'_c = s + c$ 2. Propagation around/by the anterior chamber depth $d_{CL}$ (distance between cornea and lens anterior surface) to the wavefront $s_{L1}$ with vergence matrix $s_{L1}=s'_c/(1-\tau_{CL}\cdot s'_c)$ $$S_{L1} = \frac{S'_C}{(1-\tau_{CL}\cdot S'_C)}$$

3. Refraction at the lens front surface $L_1$ with the surface refractive power matrix $L_1$ to the wavefront $s'_{L1}$ with the vergence matrix $s'_{L1}=s_{L1}+L_1$ 4. Propagation around/by the lens thickness $d_L$ to the wavefront $s_{L2}$ with vergence matrix $s_{L2}=s'_{L1}/(1-\tau_L\cdot s'_{L1})$ 5. Refraction at the lens back surface $L_2$ with the surface refractive power matrix $L_2$ to the wavefront $s'_{L2}$ with vergence matrix $s'_{L2}=s_{L2}+L_2$ 6. Propagation around/by the distance between lens and retina $d_{LR}$ to the wavefront $s_R$ with the vergence matrix $s_R=s'_{L2}/(1-\tau_{LR}\cdot s'_{L2})$ Each of steps 2, 4, 6, in which it is propagated by the distances $\tau_{CL}$, $\tau_{CL}$ and $\tau_{CL}$, can be divided into two partial propagations 2a, b), 4a, b) and 6a, b) according to the following scheme, which for step 6a, b) explicitly reads as follows:

6a. Propagation around/by the distance $d_{LR}^{(a)}$ between the lens and intermediate plane to the wavefront $S_{LR}$ with the vergence matrix $S_{LR}=S'_{L2}/(1-\tau_{LR}^{(a)}S'_{L2})$ 6b. Propagation around/by the distance $d_{LR}^{(b)}$ between intermediate plane and retina to the wavefront $S_R$ with the vergence matrix $S_R=S_{LR}/(1-\tau_{LR}^{(b)}S_{LR})$ Here, $\tau_{LR}^{(a)}=d_{LR}^{(a)}/n_{LR}^{(a)}$ and $\tau_{LR}^{(b)}=d_{LR}^{(b)}/n_{LR}^{(b)}$ can be positive or negative, where it should always hold that $n_{LR}^{(a)}=n_{LR}^{(a)}=n_{LR}$ and $\tau_{LR}^{(a)}+\tau_{LR}^{(b)}=\tau_{LR}$. In any case, steps 6a and 6b can be combined again by $S_R=S'_{L2}/(1-(\tau_{LR}^{(a)}+\tau_{LR}^{(b)})S'_{L2})=S'_{L2}/(1-\tau_{LR}\,S'_{L2})$. However, the division into steps 6a and 6b offers advantages, and preferably the intermediate plane can be placed in the plane of the exit pupil AP, which preferably is located in front of the lens back surface. In this case $\tau_{LR}^{(a)}<0$ and $\tau_{LR}^{(b)}>0$.

The division of steps 2, 4 may be analogous to the division of step 6 into 6a, b).

Decisive for the choice of the evaluation surface of the wavefront is thus not only the absolute position in relation to the z coordinate (in the direction of light), but also the number of surfaces through which refraction took place up to the evaluation surface. For example, one and the same plane can be traversed several times. By way of example, the plane of the AP (which normally is located between the lens front surface and the lens back surface) is formally traversed by the light for the first time after an imaginary step 4a, in which it is propagated from the lens front surface by the length $\tau_L^{(a)}>0$. For the second time, the same plane is reached after step 6a, when, after refraction through the lens back surface, it is propagated back to the AP plane, i.e. $\tau_{LR}^{(a)}=-\tau_L^{(a)}=-\tau_L^{(b)}<0$, which is synonymous with $\tau_{LR}^{(a)}=\tau_{LR}-\tau_{LR}^{(b)}<0$. For the wavefronts $S_{AP}$, which refer to the AP in the text, it is preferable that always the wavefront $S_{AP}=S_{LR}$ be meant (unless explicitly stated otherwise), which is the result of step 6a.

These steps 1 to 6 will be referred to again in the course of the description. They describe a preferred relationship between the vergence matrix S of a wavefront S at the cornea and the vergence matrices of all resulting intermediate wavefronts at the refractive intermediate surfaces of the eye, in particular the vergence matrix $s'_{L2}$ of a wavefront $s'_{L2}$ after the eye lens (or even a wavefront $S_R$ on the retina). These relationships can be used both to calculate parameters not known a priori (e.g. $d_{LR}$ or $L_1$) and thus to populate the model either individually or generically with values, and to then simulate the propagation of the wavefront in the eye with populated models for optimizing spectacle lenses.

A preferred embodiment deals with the surfaces and wavefronts up to the second order, wherefore a representation by vergence matrices is sufficient. A further preferred embodiment described later also considers and utilizes higher orders of aberrations.

In a second order description, in a preferred embodiment, the eye model has twelve parameters as degrees of freedom of the model, which must be populated. They preferably comprise the three degrees of freedom of the surface refractive power matrix C of the cornea C, the respectively three degrees of freedom of the surface refractive index matrices $L_1$ and $L_2$ for the lens front and back surfaces, and respectively one for the length parameters anterior chamber depth $d_{CL}$, lens thickness $d_L$ and vitreous body length $d_{LR}$.

Population of these parameters can, in principle, be made in several ways:
i) Direct, i.e. individual measurement of a parameter
ii) A priori given value of a parameter, e.g. as a literature value or from an estimate, for example by the presence of a measurement value for another variable, which correlates with the parameter to be determined on the basis of a preceding population analysis in a known manner
iii) Calculation from consistency conditions, e.g. compatibility with a known refraction The total number $df_2$ of degrees of freedom of the eye model in second order (df stands for 'degree of freedom', index, 2' for $2^{nd}$ order) is thus composed of $$df_2 = df_2(i) + df_2(ii) + df_2(iii)$$

For example, if there exist direct measurement values for all twelve model parameters, then $df_2(i)=12$, $df_2(ii)=0$ and $df_2(iii)=0$, which in the following will be expressed by the notation $df_2=12+0+0$ for the sake of convenience. In such a case, the objective refraction of the respective eye is specified as well, so that an objective refraction determination would no longer have to be performed additionally.

For the implementation of the present invention, it is not necessary to measure all parameters directly. Thus, it may be easier to measure the refraction of the respective eye or to determine it objectively and/or subjectively, than to measure all parameters of the model eye individually. Preferably, there is thus at least one refraction, i.e. measurement data for the wave front $s_M$ of the eye up to the second order, which corresponds to the data of the vergence matrix $s_M$. If the eye model is populated on the basis of purely objectively measured data, these values can be taken from aberrometric measurements or autorefractometric measurements, or according to (ii) can be assigned other given data. A consideration of subjective methods (i.e., subjective refraction), whether as a substitute for the objective measurement of the refraction or by the combination of both, will be described later. The three conditions of compliance with the three independent parameters of the vergence matrix $s_M$ thus allow to derive three parameters of the eye model, which in the notation introduced above corresponds to $df_2(iii)=3$.

It is thus possible, in cases in which not all model parameters are accessible to direct measurements or in which these measurements would be very costly, to populate the missing parameters reasonably. If, for example, there are direct measurement values only for at most nine model parameters ($df_2(i) \leq 9$), then one can utilize the mentioned conditions of the refraction to calculate three of the model parameters ($df_2(iii)=3$). If exactly $df_2(i)=9$, then all twelve model parameters are uniquely determined by the measurements and the calculation, and it holds that ($df_2(ii)=0$). On the other hand, if $df_2(i)<9$, then $df_2(ii)=9-df_2(i)>0$, i.e. the model is under-determined in the sense that $df_2(ii)$ parameters must be determined a priori.

With the provision of an individual refraction, i.e. measurement data for the wave front $S_M$ of the eye, in particular up to the second order, the necessary data of the vergence matrix $S_M$ are available accordingly. According to a method described in WO 2013/104548 A1, in particular the parameters $\{C, d_{CL}, S_M\}$ are measured. On the other hand, conventionally, inter alia, the two length parameters $d_L$ and $d_{LR}$ (or $D_{LR}$) are determined a priori (e.g. by literature values or estimation). In WO 2013/104548 A1, in particular the two cases are distinguished in which either $L_2$ is determined a priori and $L_1$ is calculated therefrom, or vice versa. As a calculation rule, the laid-open publication discloses Equation (4) or Equation (5). For both cases, it holds that $df_2=4+5+3$.

In the terminology of steps 1 to 6 mentioned above, the adaptation of $L_1$ to the measurements is effected in particular by calculating the measured vergence matrix $S_M$ by means of steps 1, 2 through the likewise measured matrix C and propagating up to the object-side side of the lens front surface. On the other hand, from an imaginary punctiform light source on the retina, one calculates a spherical wave by progressing backward through steps 6, 5, 4 from back to front, by refracting this spherical wave at the previously defined surface refractive power matrix $L_2$ of the lens back surface and then propagating the wavefront obtained from the lens back surface to the image-side side of the lens front surface. The difference of the thus determined vergence matrices $s_{L1}$ and $s'_{L1}$, which are on the object side or image side of the lens front surface, must have been caused by the matrix $L_1$, because in the aberrometric measurement, the measured wavefront emerges from a wavefront that emanates from a point on the retina, and thus due to the reversibility of the optical paths is identical to the incident wavefront ($s=s_M$) that converges at that point of the retina. This leads to equation (4) in the cited laid-open publication:

$$L_1(D_{LR}) = \frac{D_{LR} \cdot 1 - L_2}{1 + \tau_L \cdot (D_{LR} \cdot 1 - L_2)} - \frac{S_M + C}{1 - \tau_{CL}(S_M + C)} \qquad (1a)$$

The other case in the cited patent application concerns the adaptation of the matrix $L_2$ to the measurements after the matrix $L_1$ has been specified. A difference now consists only in that the measured wavefront $S_M$ is subjected to steps 1, 2, 3, 4 and the assumed wavefront from the punctiform light source only to step 6, and that the missing step to be performed to adapt the lens back surface $L_2$ is now step 5, according to equation (5) of the cited laid-open publication:

$$L_2 = \qquad\qquad (1b)$$
$$D_{LR} - \left(\frac{S_M + C}{1 - \tau_{CL}(S_M + C)} + L_1\right)\left(1 - \tau_L\left(\frac{S_M + C}{1 - \tau_{CL}(S_M + C)} + L_1\right)\right)^{-1}$$

In a preferred implementation of the invention, at least one of the length parameters $d_L$ and $d_{LR}$ (or $D_{LR}$) is calculated from other measured data and a priori assumptions on other degrees of freedom, and in particular is not itself assumed a priori.

Preferably, the data of the vergence matrix $S_M$ and particularly preferably also the data with respect to C are available from individual measurements. In a further preferred embodiment, a spherical back surface, i.e. a back surface without astigmatic components is taken as a basis for an assumption of data regarding the lens back surface.

In a preferred embodiment of the invention, for the cornea C, measurement data up to the second order, which correspond to the data of the surface refractive power matrix C, are available. Although these values can be taken from topographical measurements, the latter are not necessary. Rather, topometric measurements are sufficient. This situation corresponds to the case $df_2=3+6+3$, wherein in particular the anterior chamber depth $d_{CL}$ is one of the six parameters to be specified a priori.

As far as no further individual measurements are made, there is a situation with $df_2=3+6+3$. In order to be able to determine $d_{LR}$ unambiguously, six parameters from $\{L_1, L_2, d_L, d_{CL}\}$ must undergo assignment based on assumptions or literature values. The remaining two, in addition to $d_{LR}$, result from the calculation. In a preferred embodiment, the parameters of the lens back surface, the mean curvature of the lens front surface and the two length parameters $d_L$ and $d_{CL}$ are populated a priori (as predetermined default values).

In a preferred implementation, the anterior chamber depth $d_{CL}$, i.e. the distance between the cornea and the lens front surface, is additionally known for example from pachymetric or OCT measurements. Thus, the measured parameters include $\{C, d_{CL}, S_M\}$. This situation corresponds to the case $df_2=4+5+3$. The problem is therefore still mathematically under-determined, so that five parameters from $\{L_1, L_2, d_L\}$ must be specified a priori by assumptions or literature values. In a preferred embodiment, these are the parameters of the lens back surface, the mean curvature of the lens front surface and the lens thickness. The exact calculation method for this case will be shown below.

Just for the accuracy of the individual adaptation is it advantageous to be able to assign individual measurements to as many parameters as possible. In a preferred embodiment, the lens curvature is additionally provided in a normal meridian on the basis of an individual measurement. This results in a situation according to $df_2=5+4+3$, and it is sufficient to specify four parameters from $\{L_{1,\gamma\gamma}, \alpha_{L1}, L_2, d_L\}$ a priori. In a preferred embodiment, these are again the parameters of the lens back surface and the lens thickness. The exact calculation will again be described further below.

In particular as an alternative to the normal meridian of the lens front surface and particularly preferably in addition to the anterior chamber depth, the lens thickness can also be made available from an individual measurement. This eliminates the need to populate this parameter with model data or estimation parameters ($df_2=5+4+3$). Otherwise, the above applies. This embodiment is particularly advantageous when a pachymeter is used whose measuring depth allows the detection of the lens back surface, but not a sufficiently reliable determination of the lens curvatures.

In addition to the anterior chamber depth and a normal meridian of the lens front surface, in a preferred embodiment, one (e.g. measurement in two normal meridians) or two further parameters (measurement of both principal meridians and the cylinder axis) of the lens front surface can be detected by an individual measurement. In particular, this additional information can be exploited in two ways:

Function of a priori assumptions: One or two of the otherwise a priori assumptions can be abandoned and determined by calculation. In this case the situations $df_2=6+3+3$ or $df_2=7+2+3$ result. Thus, in the first case, the mean curvature of the back surface (assuming an astigmatism-free back surface) and in the second case, for a given mean curvature, the surface astigmatism (including the cylinder axis) can be determined. Alternatively, in both cases, the lens thickness can be determined from the measurements.

However, such a procedure generally requires a certain amount of caution, since noisy measurement data can easily lead to a "running away" or "eloping" of the released parameters. As a result, the overall model can become significantly worse rather than better. One way to prevent this is to specify anatomically reasonable limits for these parameters and to limit the variation of the parameters to this range. Of course, these limits can also be specified depending on the measured values.

Reduction of the measurement uncertainty: If, on the other hand, the same a priori assumptions continue to be made (preferably $\{L_2, d_L\}$), then there are the situations $df_2=6+4+3$ or $df_2=7+4+3$, i.e. the system is mathematically over-determined.

Instead of a simple analytical determination of $D_{LR}$ according to the following statements, $D_{LR}$ (and possibly the missing parameter from $L_1$) is determined ("fit") such that the distance between $L_1$ resulting from the equations and measured $L_1$ (or measured $L_1$ supplemented with the missing parameter) becomes minimal. This procedure can—obviously—achieve a reduction of the measurement uncertainty.

In a further preferred approach, the anterior chamber depth, two or three parameters of the lens front surface and the lens thickness are measured individually. The calculation of the remaining variables is carried out analogously, wherein the a priori assumption of the lens thickness can be replaced by the corresponding measurement.

In a further preferred approach, individual measurements of the anterior chamber depth, at least one parameter of the lens front surface, the lens thickness and at least one parameter of the lens back surface are provided. This is a supplement to the above cases. The respective additionally measured parameters can be carried out analogously to the stepwise extensions of the above sections. These cases are particularly advantageous if the above-mentioned pachymetric units, which measure in one plane, two planes or over the entire surface, are correspondingly extended in the measuring depth and are so precise that the curvature data can be determined with sufficient accuracy.

In the following, on the basis of some examples, it will be shown how the calculation of individual parameters from the other measured or a priori determined parameters and on the basis of the individual refraction data can be performed.

For example, in preferred embodiments, a measurement of the curvature of a lens surface in a normal meridian is available. Since the back surface cannot be measured in practice without also measuring the front surface, and the measurement of the front surface takes place in a preferred way, the equations for the cases of a curvature of the lens front surface known in a normal meridian will be given below. If, instead of a normal meridian of the front surface of the lens, there is a normal meridian of the back surface of the lens (for example corresponding measurements, model assumptions), the procedure must be analogous to equation (1b). Without limiting the generality, the coordinate system is laid out in such a way that the normal meridian is in the x-direction. In a next step, one then evaluates the matrix equation (1a) in the given normal meridian and solves for $D_{LR}$, and then reinserts this solution into equation (1a) for the complete specification of $L_1$.

If one equates the xx component of $L_1$ ($D_{LR}$) from Equation (1) with the measured value $L_{1,xx}$, one obtains, for this matrix element, an equation quadratic in $D_{LR}$ whose positive solution corresponds to the distance between the lens back surface and the retina:

$$D_{LR} = \frac{-b + \sqrt{b^2 - 4c}}{2a} \quad (2)$$

where:
$a = \tau_L(1 + \tau_L A)$
$b = 1 - \tau_L(tr(L_2) - AB)$ $$c = A - L_{2,xx} + \tau_L \det L_2(1 + \tau_L A) - \tau_L A \, tr(L_2) \quad (2a)$$
$$= A - L_{2,xx} + a \det L_2 - \tau_L A \, tr(L_2)$$

with $A = -S_{M,L1,xx} - L_{1,xx}$ (2b)
$B = 2 - \tau_L \, tr(L_2)$
$\det(L_2) = L_{2,xx} L_{2,xy} - L_{2,xy}^2$
$tr(L_2) = L_{2,xx} + L_{2,yy}$ and $$S_{M,L1,xx} = \frac{\tau_{CL} S'^2_{M,C,xy} + S'_{M,C,xx} \cdot (1 - \tau_{CL} S'_{M,C,yy})}{-\tau_{CL}^2 S'^2_{M,C,xy} + (1 - \tau_{CL} S'_{M,C,xx}) \cdot (1 - \tau_{CL} S'_{M,C,yy})} \quad (2c)$$

$S'_{M,C,xx} = S_{M,xx} + C_{xx}$ ($xy$ und $yy$ analog)

In the case of a symmetrical lens back surface ($L_2 = L_{2,xx} \cdot 1$), this is simplified to:

$$D_{LR} = L_{2,xx} + \frac{L_{1,xx} + S_{M,L1,xx}}{1 - \tau_L \cdot (L_{1,xx} + S_{M,L1,xx})} \quad (3)$$

with $S_{M,L1,xx}$ from Equation (2c).

In both cases, it is thus possible to calculate the lens front surface $L_1$ by inserting the respective obtained $D_{LR}$ into equation (1a):

$$L_1 = \frac{D_{LR} - L_2}{1 + \tau_L \cdot (D_{LR} - L_2)} - \frac{S_M + C}{1 - \tau_{CL}(S_M + C)} \quad (4)$$

The result is naturally symmetric ($L_{1,xy} = L_{1,yx}$) and reproduces the value inserted in (2b) or (3) for the component $L_{1,xx}$.

In some preferred embodiments, an individual measurement or specification of a mean curvature of a lens surface is available. This situation exists, for example, if the mean curvature of the lens front surface can be measured or if no measurements can be made on the lens surfaces and the mean curvature of a lens surface is assumed (for example taken from the literature). Likewise, the method for the lens front surface is described here and can be applied analogously to the lens back surface.

In this case of a given mean sphere $L_{1,ms}$ of the lens front surface, the free parameters of the cylinders are $L_{1,cyl}$ and the cylinder axis $\alpha_{L1}$. With $L_{1,diff} = L_{1,cyl}/2$, $L_1$ becomes $$L_1 = \begin{pmatrix} L_{1,ms} - L_{1,eff} \cdot \cos 2\alpha_{L1} & -L_{1,diff} \cdot \sin 2\alpha_{L1} \\ -L_{1,diff} \cdot \sin 2\alpha_{L1} & L_{1,ms} + L_{1,eff} \cdot \cos 2\alpha_{L1} \end{pmatrix} \quad (5)$$

Also, one starts again from equation (1a). Now, if one equates the expressions for $L_1$ from equations (5) and (1a), one obtains a system of equations consisting of three equations (the two non-diagonal elements are identical) and the three unknowns $L_{1,diff}$, $\alpha_{L1}$ and $D_{LR}$. This has the physically relevant solution $$D_{LR} = \frac{-\bar{b} + \sqrt{\bar{b}^2 - 4\bar{a}\bar{c}}}{2\bar{a}} \quad (6)$$

$L_{1diff} = \pm \sqrt{\sigma^2 + \gamma^2}$ $\alpha_{L1} = \frac{1}{2}\arctan(\pm \gamma, \pm \sigma) + \frac{\pi}{2}$ with $\bar{a} = \tau_L(1 + \tau_L \bar{A})$
$\bar{b} = 1 - \tau_L(tr(L_2) - \bar{A}B)$
$\bar{c} = \frac{1}{4}(\bar{A}B^2 - B \, tr(L_2) - \bar{a} \, Ast(L_2)^2)$ and $\bar{A} = \bar{S}_{M,L1} - \bar{L}_{1,mess}$ (6a)

$Ast(L_2) = \sqrt{tr(L_2)^2 - 4 \det L_2}$ $$\gamma = \frac{2\left(-1 + \sqrt{\bar{b}^2 - 4\bar{a}\bar{c}}\right)(L_{2,xx} - L_{2,yy}) + \tau_L^2 Ast(L_2)^2 (S_{M,L1,xx} - S_{M,L1,yy})}{2\tau_L^2 Ast(L_2)^2}$$

$$\sigma = \frac{2\left(-1 + \sqrt{\bar{b}^2 - 4\bar{a}\bar{c}}\right) L_{2,xy} + \tau_L^2 Ast(L_2)^2 S_{M,L1,xy}}{2\tau_L^2 Ast(L_2)^2}$$

This, too, can be simplified for the case of a rotationally symmetric lens back surface:

$$D_{LR} = L_2 + \frac{\bar{L}_{1,mess} + \bar{S}_{M,L1}}{1 - \tau_L \cdot (\bar{L}_{1,mess} + \bar{S}_{M,L1})} \quad (7)$$

$$L_1 = (\bar{L}_{1,mess} + \bar{S}_{M,L1}) \cdot 1 - \frac{S_M + C}{1 - \tau_{CL}(S_M + C)}$$

where $$\bar{L}_{1,mess} = \frac{D_{LR} - L_2}{1 + \tau_L \cdot (D_{LR} - L_2)} - \bar{S}_{M,L1}$$

with $$\bar{S}_{M,L1} = \frac{S_{M,L1,xx} + S_{M,L1,yy}}{2}$$

Thus, the individual elements of the eye model are completely calculable.

The given (i.e. measured or assumed) variables, besides a principal meridian with given angular position or mean curvature, may be other parameters such as the strongest principal meridian, the weakest principal meridian, the cylinder and the cylinder axis. Here, the procedure is analogous to the cases described.

Since in the meantime the HOA of the eye are also taken into account in the optimization of spectacle lenses, it is advantageous to also consider the HOA of the cornea or the lens when populating the eye model. When choosing HOA for the lens, it is generally true that HOA can be assigned to the lens front and back surfaces, which can also map the refractive index profile within the lens.

Preferably, the formalism presented so far is extended, especially with regard to steps 1 to 6, to the co-treatment of the HOA by applying the calculation methods of the publications of G. Esser et al.: "Derivation of the refraction equations for higher order aberrations of local wavefronts at oblique incidence", JOSA A, vol. 27, no. 2 (2010) and by G. Esser et al.: "Derivation of the propagation equations for higher orders or aberrations of local wavefronts, JOSA A, vol. 11 (2011)", in addition to the formula for the vergence matrices explicitly indicated in steps 1 to 6.

In general, the procedure in terms of counting degrees of freedom is very similar to the above. If, in addition to data on second order aberrations, data on their HOA are available for the refractive surface C of the cornea and for the emerging wavefront $S_M$ (either from measurements or from reasonable assumptions), then the wavefront $S_{L1}$ can also be determined computationally with a corresponding number of HOA. This applies regardless of the form of representation of the HOA. Particularly preferred, however, is the Taylor series, for in this form exactly the following statement applies: If HOA coefficients up to the order n are given for both surfaces C and $S_M$, then the corresponding HOA coefficients for $S_{L1}$ up to the order n can also be calculated therefrom. Further preferred is the Zernike basis, because here too a similar statement applies. However, it is only accurate if all Zernike coefficients with an order >n vanish.

Preferably, an order n is determined (in advance), up to which all participating surfaces and wavefronts are to be treated. Regardless of the representation of the HOA, the wavefronts or surfaces then have N components for the HOA besides the three components for the $2^{nd}$ order aberrations, where N depends on n and i.a. on the representation of the HOA (in the Taylor and Zernike decompositions it holds that $N=(n+1)(n+2)/2-6$).

Accordingly, the adaptation condition, on the basis of a measured wavefront, e.g. $S_{M,L1}$, then also does not just have the three components described above, but a total of a maximum of N+3 components. Correspondingly, these are facing 3 (N+3)+3=3N+12 parameters (namely the three length parameters $d_{CL}$, $d_L$ and $d_{LR}$ (or $D_{LR}$) as well as N+3 components of the cornea C and the lens surfaces $L_1$ and $L_2$). This means that the following applies:

$$df_n = df_n(i) + df_n(ii) + df_n(iii)$$
$$= 3N + 12$$

with $df_n(iii)=N+3$. If preferably the anterior chamber depth $d_{CL}$ and the cornea C are measured, it holds that $df_n(i)=N+4$ and consequently $df_n(ii)=N+5$, corresponding to the situation $df_n=(N+4)+(N+5)+(N+3)$.

The further procedure can be carried out quite analogously to the one described above.

In the measuring apparatus on which the procedure described here is based, the aberrometry unit can be used to detect the HOA of the image of the eye on the retina in transmission. Further, with the same apparatus, the HOA of the corneal surface can be measured in reflection by the topography unit. Thus both the emerging wavefront $S_M$ and the refractive surface C of the cornea, including the HOA, are available up to a certain order n. The wavefront $S_M$ supplies $df_n(iii)=N+3$ conditions for the parameter calculation. If again preferably, besides the cornea C, also the anterior chamber depth $d_{CL}$ is measured, it holds that $df_n(i)=N+4$ and consequently $df_n(ii)=N+5$, corresponding to the situation $df_n=(N+4)+(N+5)+(N+3)$.

In a preferred embodiment of the invention, when the model is populated, the HOA of the lens can now be selected in such a way that the measured wavefront arises in reverse order in the propagation of a wavefront emanating from a point of the retina according to steps 1 to 6. If the parameters of the eye model are then populated, the propagation of this wavefront emanating from a point of the retina up to the evaluation surface (according to at least some of steps 1 to 6 in reverse order) can lead to the reference wavefront, which according to the invention can be used for a comparison with the wavefront emanating from an object.

In an exemplary implementation, the adaptation of $L_1$ is carried out analogous to the method described above with reference to WO 2013/104548 A1, with the two length parameters $d_L$ and $d_{LR}$ (or $D_{LR}$) being specified a priori. The only difference now is that the lens front surface $L_1$, including its N HOA parameters up to the order n, is adapted to the measurements, according to $df_n(iii)=N+3$. The lens back surface, which is unknown due to lack of measurements, The lens back surface $L_2$, which is unknown for lack of measurement values, is specified in advance, preferably including the N HOA parameters to the order n (e.g. by literature values on the average eye of the population), according to $df_n(ii)=N+5$. This is done, in particular, by calculating the measured wavefront $S_M$ by means of steps 1, 2 through the likewise measured cornea C and propagating to the object-side side of the lens front surface $L_1$. On the other hand, from an imaginary punctiform light source on the retina, one calculates a spherical wave by progressing backward through steps 6, 5, 4 from back to front, by refracting this spherical wave at the previously defined surface refractive power matrix $L_2$ of the lens back surface and then propagating the wavefront obtained from the lens back surface to the image-side side of the lens front surface $L_1$. The thus-determined two wavefronts $S_{L1}$ and $S'_{L1}$, which lie on the object side or on the image side of the lens front surface, generally have both low-order aberrations and HOA whose values differ between the two wavefronts. Since the two wavefronts are present in one and the same measurement optical path and therefore must be related via the missing step 3, conclusions can be drawn on the refractive lens front surface $L_1$ from this difference in a clear way up to the order n, for example by the calculation methods known from G. Esser et al.: "Derivation of the refraction equations for higher orders or aberrations of local wavefronts at oblique incidence", JOSA A, vol. 2 (2010) and from G. Esser et al.: "Derivation of the propagation equations for higher orders or aberrations of local wavefronts, JOSA A, vol. 11 (2011)".

In another exemplary implementation, the adaptation of $L_2$ is carried out again in analogy to the method described above with reference to WO 2013/104548 A1, with the two length parameters $d_L$ and $d_{LR}$ (or $D_{LR}$) being specified a priori again. Now, the lens back surface $L_2$ including its HOA up to the order n is adapted to the measurements after the lens front surface $L_1$ has been specified. A difference to the adaptation of $L_1$, in particular, is that the measured wavefront $S_M$ is subjected to steps 1, 2, 3, 4 and the assumed wavefront from the punctiform light source is subjected only to step 6, and that the missing step to be carried out to adapt the lens back surface $L_2$ is now step 5.

For tracing, for example, the formalism for the refraction and propagation steps described in G. Esser et al.: "Derivation of the refraction equations for higher orders or aberrations of local wavefronts at oblique incidence", JOSA A, vol. 2 (2010) and in G. Esser et al.: "Derivation of the propagation equations for higher order aberrations of local wavefronts, JOSA A, vol. 11 (2011)" are used. In particular, it makes sense to work from the aberrations of the lowest order to the highest order of interest (typically sixth).

To use said formalisms, it is advantageous to describe the wavefronts or surfaces by the local derivation of the vertex depth in the direction of the planes perpendicular to the propagation direction. Any surface or wavefront that is not in this form is preferably first brought to this form. This can be done, for example, by transformation from a Zernike representation to the representation by local derivatives, or by a preceding fit of a vertex depth representation. A suitable technical form of representation of surfaces by Taylor coefficients is described in WO 2013/104548 A1, for example.

Of course, in analogy to the above procedure, the deviations (including the second-order aberrations) may also be distributed to the front and rear surfaces of the lens.

In a preferred embodiment, it is proposed that at least one of the length parameters $d_L$ and $d_{LR}$ be neither predetermined a priori nor measured individually, but is calculated on the basis of the individual refraction data and the other (previously) specified data. For this purpose, at least one measurement value or one assumption is provided in particular for one of the degrees of freedom of the lens surfaces $L_1$ or $L_2$. If this is e.g. a measurement value for the curvature of $L_1$ in a normal meridian, then in particular $d_{LR}$ (or $D_{LR}$) can be determined therefrom by calculation.

If the specification in the vergence matrices refers to the local curvature (this corresponds to the specification of the HOA as coefficients of a Taylor decomposition), first $D_{LR}$ and the missing parameters of the lens are determined as described above. Then, with the formalism of G. Esser et al.: "Derivation of the refraction equations for higher orders or aberrations of local wavefronts at oblique incidence", JOSA A, vol. 2 (2010) and G. Esser et al.: "Derivation of the propagation equations for higher orders or aberrations of local wavefronts, JOSA A, vol. 11 (2011)", the HOA of the lens can gradually be built up from the second to the $n^{th}$ order.

If, on the other hand, the mean curvature over a specific pupil is used, which is the case, for example, in the representation according to Zernike, the degree of freedom $D_{LR}$ is likewise specified. In this formalism, an iterative approach would be necessary due to dependencies. However, this can be avoided by a conversion between the two notations before starting the calculation.

The invention can also be used if individual measurements of the cornea's HOA but no individual measurements of the eye's HOA are available. In a preferred implementation, besides the cornea C, the anterior chamber depth $d_{CL}$ is measured as well, i.e. it holds that $df_n(i)=N+4$. If one uses an autorefractor (i.e. no measurement of the HOA) instead of an aberrometer (also in combination with a subjective refraction) or if one uses only a subjective refraction without the use of an aberrometer or autorefractor, the verifier matrix $S_M$ of the LOA is known, but beyond that there are no individual information about the HOA of the (measurement optical path) wavefront $S_M$ of the entire eye. This means, just like in the case without HOA, that there are only $df_n(iii)=3$ instead of $df_n(iii)=N+3$ calculation conditions. If one wishes to fully populate the model up to the order n, then it is preferred to specify $df_n(ii)=2N+5$ instead of $df_n(ii)=N+5$ parameters a priori. It is again preferred to consider the case that both $d_L$ and $d_{LR}$ belong to the parameters defined a priori. This allows to populate the model with the other parameters in different ways and to use it for the calculation and optimization of a spectacle lens.

In particular, this case can be treated as described above for the presence of measured HOA of the eye when making assumptions about the HOA of the eye. An example of this are values determined on the basis of a group of test persons or model-based values. In this case, a remaining spherical aberration is preferably assumed, since it is known in particular from T. O. Salmon and C. van de Pol: Normal-eye Zernike coefficients and root-mean-square wavefront errors, J Cataract Refract Surg, vol. 32, pp. 2064-2074 (2006) and from J. Porter et al.: Monochromatic aberrations of the human eye in a large population, JOSA A, vol. 8 (2001) that they are clearly different from zero on average across the population. The calculation of the HOA of the lens then takes place analogously to the above-described procedure, with the sole difference that the HOA values for $S_M$ are not taken from an individual measurement, but are based on the above-mentioned assumptions.

Alternatively, if appropriate assumptions are made about the HOA of the lens, i.e. if one specifies the HOA of both lens surfaces $L_1$ and $L_2$ a priori, for example with the aid of the algorithms from G. Esser et al.: "Derivation of the refraction equations for higher order aberrations of local wavefronts at oblique incidence", JOSA A, vol. 27, No. 2 (2010) and G. Esser et al.: "Derivation of the propagation equations for higher orders or aberrations of local wavefronts, JOSA A, vol. 11 (2011)", the HOA of the wavefront $S_M$ can be calculated to the order n by progressing backward through steps 6, 5, 4, 2, 3, 1 from the retina to the cornea. In particular, in the calculation of $S_M$, $d_L$ and $d_{LR}$ specified a priori are included as well.

For the LOA of the lens surfaces, no a priori specifications beyond the above are made, since the LOA of the wavefront $S_M$, e.g. as measured vergence matrix $S_M$, are available from the subjective refraction, the autorefractor measurement, or a combination thereof.

A preferred case here is that the HOA of the lens surfaces in the basis used are set equal to zero. Particularly preferably, this assumption is made with respect to the Taylor basis. Further preferably, this assumption is made with respect to the Zernike basis.

Although in no basis are the HOA of $S_M$ a direct image of the HOA of C, because the propagations involved introduce HOA in any case, but the advantage of vanishing HOA of the lens surfaces is the reduction of the computational effort due to many vanishing terms.

Alternatively, model-based values for the HOA of the lens surfaces can also be selected. This applies in particular to spherical aberrations, since it is known in particular from T. O. Salmon and C. van de Pol: Normal-eye Zernike coefficients and root-mean-square wavefront errors, J Cataract Refract Surg, vol. 32, pages 2064-2074 (2006) and from J. Porter et al.: Monochromatic aberrations of the human eye in a large population, JOSA A, vol. 8 (2001) that the spherical aberration of the lens is clearly different from zero on average across the population. They may be chosen independently of the measured data or depending on measured data (e.g. refraction values, spherical aberration of the cornea).

In addition, the invention can also be used if individual measurements of the HOA of the eye but no individual measurements of the HOA of the cornea are available. If one uses a keratometer instead of a keratograph, there is no individual information about the HOA of the cornea C. However, it is preferred to consider the case that cornea data is in the second order (measured surface refractive index matrix $C_M$) and that, moreover, the anterior chamber depth $d_{CL}$ is measured as well, i.e. it holds that $df_n(i)=4$.

Due to the present measurement of the wavefront $S_M$, the number of calculation conditions is given by $df_n(iii)=N+3$. The number of parameters to be specified a priori is thus given again by $df_n(ii)=2N+5$. This time, however, all three surfaces C, $L_1$ or $L_2$ can be selected to specify two of them a priori and to calculate the third one. It is again preferred to consider the case that both $d_L$ and $d_{LR}$ belong to the parameters specified a priori. Otherwise, here too, for the LOA of the lens surfaces, no a priori specifications beyond the above must be made since the LOA of the cornea C, e.g. as the measured surface refractive index matrix $C_M$, are available from the keratometer measurement.

In particular, this case can be treated as described above for the presence of measured HOA of the cornea, when assumptions about the HOA of the cornea are made. An example of this are values determined on the basis of a group of test persons or model-based values. The calculation of the HOA of the lens then takes place analogously to the procedure described above, with the sole difference that the HOA values for C are not taken from an individual measurement, but are supported by the assumptions mentioned above.

Alternatively, if appropriate assumptions are made about the HOA of the lens, i.e. if one specifies the HOA of both lens surfaces $L_1$ and $L_2$ a priori, for example, with the aid of the algorithms from G. Esser et al.: "Derivation of the refraction equations for higher order aberrations of local wavefronts at oblique incidence", JOSA A, vol. 27, No. 2 (2010) and G. Esser et al.: "Derivation of the propagation equations for higher orders or aberrations of local wavefronts, JOSA A, vol. 11 (2011)", the HOA of the cornea C tot he order n can be calculated by progressing backward through steps 6, 5, 4, 3, 2 from the retina to the cornea and in step 1, i.e. the refraction at the cornea C, adapting the HOA of C such that the wavefront thus calculated in front of the cornea coincides with the measured wavefront S including its HOA up to the order n.

A preferred case here again is, for reasons described above, that the HOA of the lens surfaces be set to zero in the basis used.

Alternatively, model-based values for the HOA of the lens surfaces can also be selected. This applies in particular to spherical aberrations, since it is known in particular from T. O. Salmon and C. van de Pol: Normal-eye Zernike coefficients and root-mean-square wavefront errors, J Cataract Refract Surg, vol. 32, pages 2064-2074 (2006) and from J. Porter et al.: Monochromatic aberrations of the human eye in a large population, JOSA A, vol. 8 (2001) that the spherical aberration of the lens is clearly different from zero on average across the population. They may be chosen independently of the measured data or depending on measured data (e.g. refrection values, spherical aberration of the cornea).

Even if neither a topograph nor an aberrometer is used, i.e. no individual measurement data on HOAs are available, model-based assumptions about the HOA of the cornea, the lens or the eye can nevertheless be made and used in the population of the eye model. The assumed values can also be selected on the basis of corresponding models as a function of measured data (for example refraction values, results of the topometry or autofractometer measurement). Examples of the exact calculation have already been described above, with the corresponding assumptions taking the place of the measured values for the HOAs. Again, this is especially true for spherical aberrations, as they are clearly different from zero on average across the population. It may be chosen independently of the measured data or as a function of measured data (e.g. refraction values, results of the topometry or autorefractometer measurement) and assigned to the cornea, one of the two lens surfaces, or combinations thereof.

Due to the great importance of subjective refraction, it is advantageous to at least partially consider the results of such a subjective eyeglass determination in the population of the model for the optimization. Preferably, subjective refraction data in the form of sphere, cylinder and cylinder axis are provided. For the sake of simplicity, the description of the procedure is based on this notation with sph, cyl and a for the values of sphere, cylinder and axis position.

If HOA are not taken into account, the following can be done:

If only the values of the subjective refraction are to be considered in the optimization, the measurement of the wavefront $S_M$ by an aberrometer or an autorefractometer can be dispensed with, and instead the matrix $S_M$ can be built up from the subjective values:

$$S_M = \begin{pmatrix} \left(sph + \frac{1}{2} \cdot cyl\right) - \frac{1}{2} \cdot cyl \cdot \cos(2a) & -\frac{1}{2} \cdot cyl \cdot \sin(2a) \\ -\frac{1}{2} \cdot cyl \cdot \sin(2a) & \left(sph + \frac{1}{2} \cdot cyl\right) + \frac{1}{2} \cdot cyl \cdot \cos(2a) \end{pmatrix}$$

Preferably, however, the results of the subjective refraction are combined with those of the aberrometric or autorefractometric measurement. For this purpose, an optimized refraction is determined on the basis of both data records, for example according to a method described in DE 10 2007 032 564 A1. It is described by the values $sph_{opt}$, $cyl_{opt}$ and $a_{opt}$. Analogous to the previous section, $S_M$ is obtained as $$S_M = \begin{pmatrix} \left(sph_{opt} + \frac{1}{2} \cdot cyl_{opt}\right) - \frac{1}{2} \cdot cyl_{opt} \cdot \cos(2a_{opt}) & -\frac{1}{2} \cdot cyl_{opt} \cdot \sin(2a_{opt}) \\ -\frac{1}{2} \cdot cyl_{opt} \cdot \sin(2a_{opt}) & \left(sph_{opt} + \frac{1}{2} \cdot cyl_{opt}\right) + \frac{1}{2} \cdot cyl_{opt} \cdot \cos(2a_{opt}) \end{pmatrix}$$

According to DE 10 2007 032 564 A1, not all values of the subjective refraction or objective measurement have to be included in the optimized refraction values. Thus, for example, in the case of a determination of the optimized refraction values for proximity or, in the case of expected instrument myopia, the use of the objectively measured sphere or the objectively measured defocus term can be dispensed with.

Even with the inclusion of subjective refraction data, HOA can be taken into account when populating the model. For this purpose, when using the subjective refraction values, it is necessary to include them into the data record in a consistent manner. To simplify the presentation, a formalism based on Zernike coefficients is chosen below, although in principle another basis can also be used.

In the following, the relationship between a set of Zernike coefficients for representing wavefronts ($c_{nm}$) with $r_0$ as the radius of the wavefront and refraction values (sph, cyl, a) is considered first. The radius $r_0$ is preferably either measured or specified based on model assumptions. For example, if one uses the RMS metric, the bijective context yields $$\begin{pmatrix} c_{2,-2} \\ c_{2,0} \\ c_{2,+2} \end{pmatrix} = g_{RMS}(sph, cyl, a) = \frac{r_o^2}{2\sqrt{6}} \cdot \begin{pmatrix} \frac{1}{2} \cdot cyl \cdot \sin(2a) \\ -\frac{1}{\sqrt{2}} \cdot \left(sph + \frac{1}{2} cyl\right) \\ \frac{1}{2} \cdot cyl \cdot \cos(2a) \end{pmatrix} \Leftrightarrow \begin{pmatrix} sph \\ cyl \\ a \end{pmatrix} =$$

$$f_{RMS}(c_{2,-2}, c_{2,0}, c_{2,+2}) = \begin{pmatrix} -\frac{4\sqrt{3}}{r_0^2} \cdot \left(c_{2,0} - \frac{1}{\sqrt{2}} \cdot \sqrt{c_{2,-2}^2 + c_{2,+2}^2}\right) \\ -\frac{4\sqrt{6}}{r_0^2} \cdot \sqrt{c_{2,-2}^2 + c_{2,+2}^2} \\ \frac{1}{2} \cdot \arctan(c_{2,+2}, c_{2,-2}) + \frac{\pi}{2} \end{pmatrix}$$

However, this is to be understood only as an example of a metric of the general form $$\begin{pmatrix} sph \\ cyl \\ a \end{pmatrix} = f_0(c_{2,-2}, c_{2,0}, c_{2,+2}) \Leftrightarrow \begin{pmatrix} c_{2,-2} \\ c_{2,0} \\ c_{2,+2} \end{pmatrix} = g_0(sph, cyl, a) \quad (8)$$

In addition, there are correlations in which HOA are also considered in the refraction values. This map is then still surjective for the calculation of the refraction values, but no longer bijective, i.e. the complete set of all Zernike coefficients of all aberrations cannot be reproduced clearly from the refraction values. However, the coefficients of the lower-order aberrations can also be unambiguously determined here again if the coefficients for the HOA are predetermined:

$$\begin{pmatrix} sph \\ cyl \\ a \end{pmatrix} = \quad (9)$$

$$f_1(c_{2,-2}, c_{2,0}, c_{2,+2}, c_{i,j}) \Leftrightarrow \begin{pmatrix} c_{2,-2} \\ c_{2,0} \\ c_{2,+2} \end{pmatrix} = g_1(sph, cyl, a, c_{i,j}) \, (i > 2)$$

Naturally, analogous calculations and derivations are also possible in other notations, such as with the local derivatives of the wavefronts used in the publications by G. Esser et al.: "Derivation of the refraction equations for higher orders or aberrations of local wavefronts at oblique incidence", JOSA A, vol. 27, no. 2 (2010) and by G. Esser et al.: "Derivation of the propagation equations for higher orders or aberrations of local wavefronts, JOSA A, vol. 11 (2011)". If autorefractometric measurements with data on HOA are available, this data or parts of this data can be used to determine a set of optimized refraction data together with the subjective refraction values, for example according to DE 10 2007 032 564 A1. Here, the simultaneous use of both subjective refraction data and the measurement data is not required. The variables referred to as optimized refraction values ($sph_{opt}$, $cyl_{opt}$ and $a_{opt}$) in this section can thus also be taken directly from the subjective refraction determination without the use of objective measurement variables.

In principle, not all values of the subjective refraction or objective measurement must be considred in the optimized refraction values. Thus, for example, in the case of a determination of the optimized refraction values for proximity or, in the case of expected instrumental myopia, the use of the objectively measured sphere or the objectively measured defocussed terms can be dispensed with.

On the basis of the optimized refraction values, a wavefront (preferably represented by the Zernike coefficients $o_{i,j}$) that corresponds to these optimized values is determined then. This wavefront is then used instead of the measured outgoing wavefront described above. When a metric according to equation (8) is used, it is possible to calculate the second-order coefficients of this wavefront from the optimized refraction values according to equation (8) and to directly apply the higher-order coefficients from the objective measurement of the outgoing wavefront, represented by the coefficients $m_{i,j}$:

$$\begin{pmatrix} o_{2,-2} \\ o_{2,0} \\ o_{2,+2} \end{pmatrix} = g_0(sph_{opt}, cyl_{opt}, a_{opt}) \, o_{i,j} = m_{i,j} \, (i > 2)$$

In contrast, when a metric according to equation (9) is used, the second-order coefficients of the wavefront ($o_{i,j}$) not only depend on the optimized refraction, but are to be chosen such that the following applies $$\begin{pmatrix} sph_{opt} \\ cyl_{opt} \\ a_{opt} \end{pmatrix} = f_1(o_{2,-2}, o_{2,0}, o_{2,+2}, o_{i,j}) \, (i > 2)$$

and therefore additionally depend directly on the higher-order coefficients of the measured outgoing wavefront $m_{i,j}$:

$$\begin{pmatrix} o_{2,-2} \\ o_{2,0} \\ o_{2,+2} \end{pmatrix} = g_1(sph_{opt}, cyl_{opt}, a_{opt}, m_{i,j}) \, o_{i,j} = m_{i,j}$$

The evaluation of the aberrations during the calculation or optimization process can be carried out at different locations in the optical path, i.e. the evaluation surface can be provided at different positions. While in many conventional methods the evaluation surface was located at a vertex sphere in front of the eye, it would also be possible in principle to carry out the evaluation at the retina, i.e. after complete passage of the object light through the entire model eye up to the retina.

According to the invention, it has been recognized that it is particularly advantageous not to provide the evaluation surface behind the lens back surface or behind the exit pupil. Instead, the evaluation of the imaging wavefront of the object light should advantageously take place within the model eye but in particular in front of the glass body of the model eye. The object light is thus not propagated through the glass body for each evaluation point (visual point) of the spectacle lens and for each iteration step. Instead, a reference wavefront R is defined within the model eye, which is then used in lens optimization, for example. This reference wavefront has the property that it leads to a punctiform image in the case of further propagation through the eye to the retina. Accordingly, the reference wavefront can be determined by backpropagation of a wavefront, which converges on the retina in one point, from the retina to the position of the reference wavefront. Since, for example, the measured wavefront $S_M$ is exactly the wavefront that emerges from a punctiform light source on the retina, it is also possible to propagate said wavefront into the interior of the eye up to the position of the reference wavefront.

Mathematically, both approaches are equivalent and lead to the same formulas for the reference wavefront. In the following, for deriving the respective reference wavefronts, the way involving fewer propagation steps and allowing a simpler representation will be chosen. In the following, only the handling of the components of defocus and astigmatism will be described by way of example. However, an extension to HOA and the use of subjective refraction is also possible and advantageous.

Taking HOA into account, one may proceed analogously to the calculation of the HOA according to the statements below by refraction (G. Esser et al.: "Derivation of the refraction equations for higher order aberrations of local wavefronts at oblique incidence", JOSA A, vol. No. 2 (2010)) and propagation (G. Esser et al.: "Derivation of the propagation equations for higher orders or aberrations of local wavefronts", JOSA A, vol. 28, No. 11 (2011)).

Since wavefront propagation is a nonlinear process, spectacle lens optimization that evaluates an imaging wavefront by comparison with a reference wavefront generally results in different results, depending on at which surface within the eye this comparison takes place.

In a preferred embodiment, only the very last step (in particular step 6b), i.e. the propagation from the AP to the retina, is dispensed with. Thus, after refraction at the lens rear surface, the incident wavefront is simulated only up to the AP (i.e. calculation of $S_{AP}$ according to the aforementioned step 6a) and there compared with a reference wavefront $R_{AP}$. It is characterized by the fact that in the propagation to the retina it yields a punctiform image there. According to the above, the vergence matrix of this wavefront is even $$R_{AP} = D_{AP} = D_{LR}^{(b)} = \frac{1}{\tau_{LR}^{(b)}} \mathbf{1} = \frac{1}{\tau_{LR} - \tau_{LR}^{(a)}} \mathbf{1} = \frac{1}{1/D_{LR} - d_{LR}^{(a)}/n_{LR}} \mathbf{1}$$

with the $D_{LR}$ determined from equations (2) and (3) and the negative (accommodation-dependent) value $d_{LR}^{(a)} < 0$ whose magnitude describes the distance between the lens back surface and the AP.

In a further preferred embodiment, the penultimate step, so overall the propagation from the lens back surface to the retina is dispensed with. The incident wavefront is thus simulated only up to after the refraction at the lens back surface (i.e. calculation of $S'_{L2}$ according to step 5 mentioned above) and compared with a reference wavefront $R'_{L2}$ there. It is characterized by the fact that in the propagation to the retina it yields a punctiform image there. According to the above, the vergence matrix of this wavefront is even $$R'_{L2} = D'_{L2} = D_{LR} \cdot \mathbf{1}$$

with $D_{LR}$ determined from equation (2) or (3).

A further simplification results when the comparison is made before the refraction through the lens back surface. In this case, the incident wavefront only needs to be simulated, i.e. calculated, up to $S_{L2}$ according to step 4 above. For this purpose, a reference wavefront $R_{L2}$ is defined in analogy to $S'_{L2}$, which after the refraction at the lens back surface and the propagation to the retina yields a punctiform image there. This is determined as $$R_{L2} = R'_{L2} - L_2 = D_{LR} \cdot \mathbf{1} - L_2$$

with the $D_{LR}$ determined from equation (2) or (3) and $L_2$ known from the literature or from measurements.

In the case of a rotationally symmetric lens back surface, this simplifies as $$R_{L2} = (D_{LR} - L_{2,xx}) \cdot \mathbf{1}$$

In particular, as far as the lens thickness is also taken from the literature, it is suitable in a further preferred embodiment to dispense with the propagation through the lens as a next simplification step and to perform the comparison behind the refraction through the lens front surface. In continuation of the above, it is preferable to use a reference wavefront $R'_{L1}$, which arises from $R_{L2}$ by backpropagation by the lens thickness and has the following convergence matrix:

$$R'_{L1} = R_{L2}/(1 + \tau_L R_{L2})$$

with $D_{LR}$ determined from equation (2) or (3) and $\tau_L = d_L/n_L$ known from the literature or from measurements, as well as the vergence matrix $R_{L2}$ determined from equation (6) or (7).

In the case of a rotationally symmetric lens back surface, this simplifies as $$R'_{L1} = \frac{D_{LR} - L_{2,xx}}{1 + \tau_L \cdot (D_{LR} - L_{2,xx})} \cdot \mathbf{1}$$

As in the above models, even if the consideration takes place before the last steps and—depending on the notation—the variable $D_{LR}$ does not explicitly occur, this variable is at least implicitly considered together with $d_L$ and $L_2$, since together they control the distribution of the power $L_1$ in the lens front surface.

An even further simplification is obtained by placing the comparison before the refraction through the lens front surface. In this case, the incident wavefront need only be simulated until $S_{L1}$ according to step 2. For this purpose, analogously to $R'_{L1}$, a reference wavefront $R_{L1}$ is defined, which after refraction at the lens front surface and the further steps converges to a point at the retina. It can be calculated either by refraction of $R'_{L1}$ at $L_1$ or directly from the refraction of the measured wavefront $S_M$ at the cornea C and a subsequent propagation around/by $d_{CL}$. In both cases one obtains $$R_{L1} = \frac{S_M + C}{1 - \tau_{CL} \cdot (S_M + C)}$$

The quantities $D_{LR}$, $d_L$ and $L_2$ are no longer included here, so that it is sufficient to know $S_M$, C and $d_{CL}$.

Associated with relatively little computational effort is an embodiment in which the comparison is performed after refraction on the cornea. In this case only $S_M$ and C are considered:

$$R'_C = S_M + C$$

Another very efficient possibility is the positioning of the evaluation surface at the exit pupil of the model eye. It is preferably in front of the lens back surface.

The eye model and its population can be extended as follows:

Basically, the eye model can distinguish between the cornea and the anterior chamber. For this purpose, a corneal back surface $C_2$ is introduced behind the corneal front surface $C_1$ (formerly C) at a distance $d_C$, and two different refractive indices $n_C$ and $n_{CL}$ are stipulated for the cornea and the anterior chamber. Further, the above-mentioned first step (refraction of the wavefront S at the cornea C to wavefront S'c with vergence matrix $s'_C = s + c$ is replaced by the following three steps:

1a: Refraction of the wavefront S at the corneal front surface C, to the wavefront $S'_{C1}$ with the vergence matrix $s'_{C1} = s +$
1b: Propagation around/by the thickness of the cornea $d_C$ to the wavefront with vergence matrix $s_{C2} = s'_{C1}(1 - \tau_C s'_{C1})$
1c: Refraction at the corneal back surface $C_2$ to the wavefront $S'_{C2}$ with vergence matrix $S'_{C2} = S_{C2} + C_2$ where $$\tau_C = \frac{d_C}{n_C}$$

Analogous to the other values, the values for $d_C$ and $C_2$ can also be measured, taken from or derived from the literature. By way of example, some possibilities for $C_2$ are described here:

Thus, if there is no measurement on the corneal back surface, the shape of the corneal back surface can be taken from known eye models. Alternatively, in this case, the corneal back surface can be derived from the measured shape of the corneal front surface. For this purpose, it is advisable to assume either a uniform corneal thickness (defined, for example, as "in the direction of the vertex depth" or "in the radial direction starting from a corneal center of curvature"). The thickness can either be taken from a measurement, be derived from this or be taken from literature. Furthermore, local properties can only partially be transferred to the back surface.

If only a principal meridian of the corneal back surface is measured, this information can be used to reconstruct the entire back surface. This can be done, for example, by establishing a function of the thickness or vertex depth of the corneal back surface from the radius or the thickness of the vertex depth of the front surface.

In most such cases, the cornea's front and back surfaces in the same normal meridian (i.e. here in the x-direction) will be known.

The fact that the human eye is a non-centered optical system can be accommodated by arranging the optical elements in a way offset and/or tilted relative to a central axis.

This may refer to the individual elements as a whole (i.e. cornea and lens) or all refractive surfaces individually (corneal front surface, if necessary, cornea bacl surface, lens front surface and lens back surface). The corresponding parameters are each, for example, two lateral coordinates of the displacement of the center of the element or the surface of the central axis and two tilt angles. Alternatively, first-order Zernike coefficients (tip/tilt) can also be used.

The relevant variable affected by the change compared with a centered system is the main ray underlying the invention for all calculations and corresponding to the centered optical axis systems dealt with so far. In the general case, the main ray is the ray emanating from the retina as the center of the measurement wavefront (preferably the location of the fovea) and passing through the center of the entrance pupil. Unlike in the centered system, in which this ray coincides with the global z-axis of the eye model in appropriate coordinates, the ray is now only in part(s) straight from one boundary surface to the next, and is incident on each boundary surface in a decentered way and at certain angles of incidence. Before one calculates the wavefronts (second-order or higher-order), the course of the man ray, the positions of the penetration points and the respective angles of incidence must be determined.

If the changes of the individual elements are small compared to a centered system, the main ray can approximately be determined by the following affine equations. They correspond to an affine extended form of linear optics with respect to a global coordinate system. Each propagation of a beam with lateral coordinate r and directional angle α against the global z-axis by a length d is mapped by the 2×2-transfer matrix equation $$\begin{pmatrix} r' \\ \alpha' \end{pmatrix} = \begin{pmatrix} 1 & d \\ 0 & 1 \end{pmatrix} \begin{pmatrix} r \\ \alpha \end{pmatrix} \quad (10a)$$

on the propagated beam with lateral coordinate r' and direction angle α'. Refraction, on the other hand, is described by the extended 2×2 transfer matrix equation $$\begin{pmatrix} r' \\ \alpha' \end{pmatrix} = \begin{pmatrix} 1 & 0 \\ \left(\frac{n}{n'} - 1\right)\rho & \frac{n}{n'} \end{pmatrix} \begin{pmatrix} r \\ \alpha \end{pmatrix} + \begin{pmatrix} \Delta r \\ \Delta \alpha \end{pmatrix} \quad (10b)$$

Here, ρ is the curvature of the refractive surface and n, n' are the refractive indices before and after refraction. Further, Δr and Δα are corrective components of the ray parameters, which result from the lateral displacement and the tilt of the refractive boundary surface, and can be determined from the tilt and shift parameters of the surface using Prentice's rule, for example. For cylindrical surfaces, the 4×4 transfer matrix equations should be used accordingly.

If the approximation described in equations (10a) and (10b) is insufficient, the man ray, i.e. all penetration points through the surfaces can be determined numerically. In both cases, the main ray determination has the effect that all propagation distances, the coordinates of the penetration points and the incidence and exit angles ε, ε' are determined each boundary surface. In the case of the affine equations, ε, ε' result from α, α', and the surface normals, which can be determined from r, the decentration and the dioptric power according to Prentice's rule at the penetration point. In the general case, ε, ε' result from the numerical main ray tracing and the surface normals at the penetration point r. The latter can e.g. be calculated by deriving the surface representation (e.g. Taylor representation or Zernike representation around the point r=0, or B-splines) at the point r.

The surface refractive index matrix C is constant in the case of the affine equations and given by the respective refractive element. In the case of numerical tracing, C results at the penetration point by the local second derivatives with respect to a local coordinate system.

With the thus calculated incidence and exit angles $\varepsilon$, $\varepsilon'$ and the optionally newly determined surface refractive index matrix C, the calculation methods of the invention can also be applied to decentred systems as described in the following:

In the second order, in the refraction, instead of the vergence equation in matrix from s'=s+c is replaced by the generalized Coddington equation $$\text{Cos}(\varepsilon')S'_C\text{Cos}(\varepsilon') = \text{Cos}(\varepsilon)\,S\,\text{Cos}(\varepsilon) + v\,C \quad (11)$$

with $$v = \frac{n'\cos\varepsilon' - n\cos\varepsilon}{n' - n}$$

$$\text{Cos}(\varepsilon) = \begin{pmatrix} 1 & 0 \\ 0 & \cos(\varepsilon) \end{pmatrix} \text{ und } \text{Cos}(\varepsilon') = \begin{pmatrix} 1 & 0 \\ 0 & \cos(\varepsilon') \end{pmatrix} \quad (11a)$$

The propagation equation S'=S/(1−$\tau$S) with $\tau$=d/n is replaced by the matrix equation $$s' = s/(1 - \tau_{\alpha,r}\cdot S)\, mit\, \tau_{\alpha,t} = d_{\alpha,r}/n \quad (12)$$

In this case, $d_{\alpha,r}$ denotes the actual spatial distance between the penetration points of the successive surfaces.

If HOA are to be taken into account, then for refraction and propagation, instead of equations (11) and (12), the correspondingly extended equations for the respective orders from the publications of G. Esser et al.: "Derivation of the refraction equations for higher order aberrations of local wavefronts at oblique incidence", JOSA A, vol. 27, no. 2 (2010) and G. Esser et al.: "Derivation of the propagation equations for higher orders or aberrations of local wavefronts, JOSA A, vol. 11 (2011)" are to be used and to this end, the coefficients of the Taylor development of the refractive surface in the coordinate system of the ray incidence are to be determined as described here.

Furthermore, a—also shifted or tilted—aperture can be introduced to take into account vignetting by the iris.

In the following, commercially available apparatuses with which parameter measurements necessary or preferred for the invention can be carried out are collectively again mentioned by way of example. All apparatuses listed here are also described, for example, in M. Kaschke et al. "Optical Devices in Ophthalmology and Optometry", Wiley-VCH (2014):

Shape of the corneal front surface: The shape of the corneal front surface can be determined with leratographs (e.g. Placido-Disk Keratograph ATLAS 9000 from Zeiss, Small-Target Keratograph E300 from Medmont, and Placido-Disk Unit of Galilei G2 from Ziemer). In cases in which only the curvatures are determined and used, the use of keratometers (e.g. manual Helmholtz-Littmann Keratometer from Zeiss, manual Javal-Schiötz Keratometer from Haag-Streit and automatic electro-optical keratometry unit of the IOL Masters from Zeiss) is also possible.

Shape of the lens front and back surfaces: The shape of the lens surfaces can be measured in a meridian or three-dimensionally with Scheimpflug cameras (e.g. Pantacam from Oculus, SL-45 from Topcon and Ga-lilei G2 from Ziemer) and OCTs (e.g. IOL Master from 500 from Zeiss, SL-OCT from Heidelberg and Visante OCT from Zeiss).

Distance between the surfaces described: Distances between the three surfaces mentioned can be measured both with some of the above-mentioned Scheimpflug cameras and OCTs and with the Lenstar LS900 from Haag-Streit. Some of these devices could also be used to measure the distance between these surfaces and the retina. However, such measurements are usually very expensive and can be avoided in the context of the present invention. For example, reference is made to R. B. Rabbetts "Bennett & Rabbetts' Clinical Visual Optics", Butterworth Heinemann Elsevier Health Sciences (2007).

Refractive indices of the participating media: It is not necessary here to mention devices with which the refractive indices of the participating media can be measured, since these values are preferably taken from literature. For example, reference is made to R. B. Rabbetts "Bennett & Rabbetts' Clinical Visual Optics", Butterworth Heinemann Elsevier Health Sciences (2007).

Higher or lower-order aberrations of the eye: Aberrations of the eye can be measured with aberrometers (e.g. iProfiler from Zeiss and KR-1W from Topcon on the basis of Schack-Hartmann sensors and OPD-Scan III from Nidek on the basis of dynamic siascopy). If one considers the low-order aberrations, the use of autorefractometers (e.g. RM-8900 from Topcon and KW-2000 from Kowa) is sufficient.

LIST OF REFERENCE NUMERALS

10 main ray
12 eye
14 first surface of the spectacle lens (front surface)
16 second surface of the spectacle lens (back surface)
18 corneal front surface
20 eye lens

The invention claimed is:

1. A computer-implemented method for producing a spectacle lens by calculating or optimizing the spectacle lens for at least one eye of a spectacle wearer, comprising:
   providing individual refraction data of the at least one eye of the spectacle wearer;
   defining, by a computer, an individual eye model, in which at least a shape of a corneal front surface of a model eye and a reference aberration at an evaluation surface within the model eye are defined based on individual measurement values for the eye of the spectacle wearer and/or on standard values and/or based on the provided individual refraction data such that the model eye exhibits the provided refraction data;
   specifying a first surface and a second surface for the spectacle lens to be calculated or optimized;
   determining, by the computer, the path of a main ray through at least one visual point of at least one surface of the spectacle lens to be calculated or optimized into the model eye at least up to the evaluation surface;
   evaluating, by the computer, an aberration of a wavefront propagating along the main ray and resulting from a spherical wavefront incident on the first surface of the spectacle lens at the evaluation surface in comparison to the reference aberration;
   iteratively varying, by the computer, the at least one surface of the spectacle lens to be calculated or optimized until the evaluated aberration corresponds to a predetermined target aberration; and manufacturing the thus calculated or optimized spectacle lens on a manufacturing machine.

2. The method according to claim 1, wherein the reference aberration describes an aberration of a reference wavefront converging approximately in one point on a retina of the eye model before refraction on a lens back surface of a lens of the model eye.

3. The method according to claim 1, wherein the evaluation surface is located at a boundary surface of the model eye.

4. The method according to claim 3, wherein evaluating the aberration of the wavefront, propagating along the main ray, at the evaluation surface comprises calculating a refraction of the wavefront at the boundary surface at which the evaluation surface is located.

5. The method according to claim 3, wherein the reference aberration describes the aberration of the reference wavefront converging in a point on a retina of the eye model prior to a refraction at the boundary surface at which the evaluation surface is located.

6. The method according to claim 1, which comprises determining the reference wavefront by calculating propagation and refraction from a point on the retina of the model eye through the model eye up to the evaluation surface.

7. The method according to claim 1, wherein providing individual refraction data of the at least one eye of the spectacle wearer comprises providing an individual refraction wavefront of the eye of the spectacle wearer, which describes a wavefront, exiting the spectacle wearer's eye, of light emanating from a point on the retina of the spectacle wearer's eye, and wherein the method further comprises determining the reference wavefront with the provided individual refraction wavefront by calculating propagation and refraction based on the individual refraction wavefront through the model eye up to the evaluation surface.

8. The method according to claim 1, wherein in the individual eye model furthermore at least a cornea-lens distance, and the shape of a lens front surface of the lens of the model eye, are defined based on individual measurement values for the eye of the spectacle wearer and/or on standard values and/or based on the provided individual refraction data such that the model eye exhibits the individual refraction data provided.

9. The method according to claim 8, wherein in the individual eye model furthermore at least a lens thickness and the shape of a lens back surface of the lens of the model eye are defined based on individual measurement values for the eye of the spectacle wearer and/or on standard values and/or based on the provided individual refraction data such that the model eye exhibits the individual refraction data provided.

10. The method according to claim 9, wherein defining the lens thickness and the shape of the lens back surface is carried out on the basis of standard values, and wherein defining the shape of the lens front surface comprises:

calculating the shape of the lens front surface taking into account the provided individual refraction data.

11. The method according to claim 8, wherein defining the cornea-lens distance takes place on the basis of individual measurement values for the cornea-lens distance.

12. The method according to claim 8, wherein the evaluation surface is located at the lens front surface of the model eye.

13. The method according to claim 1, wherein the evaluation surface is located at the lens back surface of the model eye.

14. The method according to claim 1, wherein the evaluation surface is located at the corneal front surface of the model eye.

15. The method according to claim 1, wherein defining the shape of the corneal front surface of the model eye; is carried out based on individual measurements at least partially along the principal meridians of the cornea of the at least one eye or based on individual measurements of the cornea topography of the at least one eye.

16. A non-transitory storage medium with computer executable instructions stored thereon, which when loaded and executed on a computer, perform a method for calculating or optimizing a spectacle lens according to claim 1 and generate instructions for manufacturing the thus calculated or optimized spectacle lens on a manufacturing machine.

17. An apparatus for producing a spectacle lens by calculating or optimizing the spectacle lens for at least one eye of a spectacle wearer, comprising:

one or more processors; and a memory configured to store a program of instructions executable by the processors for:

a data interface for providing individual refraction data of the at least one eye of the spectacle wearer;

a modelling module for defining an individual eye model, which defines at least a shape of a corneal front surface of a model eye, and a reference aberration at an evaluation surface within the model eye based on individual measurement values for the eye of the spectacle wearer and/or on standard values and/or based on the provided individual refraction data such that the model eye exhibits the provided individual refraction data provided;

a surface model database for specifying a first surface and a second surface for the spectacle lens to be calculated or optimized;

a main ray determination module for determining the path of a main ray through at least one visual point (i) of at least one surface of the spectacle lens to be calculated or optimized into the model eye at least up to the evaluation surface;

an evaluation module for evaluating an aberration of a wavefront propagating along the main ray and resulting from a spherical wavefront incident on the first surface of the spectacle lens at the evaluation surface in comparison to the reference aberration;

an optimization module iteratively varying the at least one surface of the spectacle lens to be calculated or optimized until the evaluated aberration corresponds to a predetermined target aberration; and a module to generate instructions for manufacturing the thus calculated or optimized spectacle lens on a manufacturing machine.

* * * * *